US012412112B2

(12) United States Patent
Li et al.

(10) Patent No.: US 12,412,112 B2
(45) Date of Patent: Sep. 9, 2025

(54) IMPROVING QUANTUM GATE INFIDELITY IN TRAPPED ION QUANTUM COMPUTERS

(71) Applicant: IONQ, INC., College Park, MD (US)

(72) Inventors: Ming Li, Silver Spring, MD (US); Kenneth Wright, Berwyn Heights, MD (US); Neal C. Pisenti, Laurel, MD (US); Kristin Marie Beck, Livermore, CA (US); Jason Hieu Van Nguyen, Hyattsville, MD (US); Yunseong Nam, North Bethesda, MD (US)

(73) Assignee: IONQ, INC., College Park, MD (US)

( * ) Notice: Subject to any disclaimer, the term of this patent is extended or adjusted under 35 U.S.C. 154(b) by 1029 days.

(21) Appl. No.: 17/477,148

(22) Filed: Sep. 16, 2021

(65) Prior Publication Data

US 2024/0403678 A1    Dec. 5, 2024

Related U.S. Application Data

(60) Provisional application No. 63/083,469, filed on Sep. 25, 2020.

(51) Int. Cl.
*G06N 10/20* (2022.01)
*G06N 10/40* (2022.01)
*G06N 10/70* (2022.01)

(52) U.S. Cl.
CPC ............ *G06N 10/20* (2022.01); *G06N 10/40* (2022.01); *G06N 10/70* (2022.01)

(58) Field of Classification Search
CPC combination set(s) only.
See application file for complete search history.

(56) References Cited

U.S. PATENT DOCUMENTS

| 9,858,531 | B1 * | 1/2018 | Monroe | G06F 15/76 |
| 11,354,589 | B2 * | 6/2022 | Kim | G06N 10/40 |
| 11,455,563 | B2 * | 9/2022 | Shehab | G06N 10/40 |
| 2006/0010187 | A1 * | 1/2006 | Brown | B82Y 10/00 |
| | | | | 324/307 |
| 2020/0082291 | A1 * | 3/2020 | Debnath | G06N 10/40 |

(Continued)

OTHER PUBLICATIONS

Schäfer, V. M., et al. "Fast quantum logic gates with trapped-ion qubits." Nature 555.7694 (2018): 75-78 (Year: 2018).*

(Continued)

*Primary Examiner* — Shahid K Khan
(74) *Attorney, Agent, or Firm* — Patterson + Sheridan, LLP

(57) ABSTRACT

A method of performing a quantum gate operation in an ion trap quantum computing system includes identifying one or more error mechanisms that cause a quantum computational error in a quantum gate operation on a first trapped ion of an ion chain comprising a plurality of trapped ions, wherein the quantum gate operation is performed by applying a first Raman laser beam and a second Raman laser beam, computing a first amplitude of the first Raman laser beam, and a second amplitude of the second Raman laser beam such that the effect of the identified one or more error mechanisms is accounted for, and applying the first Raman laser beam having the computed first amplitude and the second Raman laser beam having the computed second amplitude on the first trapped ion to perform the quantum gate operation on the first trapped ion.

17 Claims, 8 Drawing Sheets

(56) References Cited

U.S. PATENT DOCUMENTS

2021/0116784 A1* 4/2021 Sutherland ............... G02F 3/00

OTHER PUBLICATIONS

Jones, Jonathan A. "Composite pulses in NMR quantum computation." arXiv preprint arXiv:0906.4719 (Year: 2009).*

C. J. Ballance, T. P. Harty, N. M. Linke, M. A. Sepiol, and D. M. Lucas, High-Fidelity Quantum Logic Gates Using Trapped-Ion Hyperfine Qubits, Phys. Rev. Lett. 117, 060504 (2016).

J. P. Gaebler, T. R. Tan, Y. Lin, Y. Wan, R. Bowler, A. C. Keith, S. Glancy, K. Coakley, E. Knill, D. Leibfried, and D. J. Wineland, High-Fidelity Universal Gate Set for 9Be+ Ion Qubits, Phys. Rev. Lett. 117, 060505 (2016).

D. Kielpinski, C. Monroe, and D. J. Wineland, Architecture for a large-scale ion-trap quantum computer, Nature 417, 709 (2002).

J. M. Pino, J. Dreiling, C. Figgatt, J. Gaebler, S. Moses, M. S. Allman, C. Baldwin, M. Foss-Feig, D. Hayes, K. Mayer, C. Ryan-Anderson, and B. Neyenhuis, Demonstration of the trapped-ion quantum-CCD computer architecture, arXiv:2003.01293 (2020).

C. Monroe, R. Raussendorf, A. Ruthven, K. R. Brown, P. Maunz, L.-M. Duan, and J. Kim, Large-scale modular quantum-computer architecture with atomic memory and photonic interconnects, Phys. Rev. A 89, 022317 (2014).

N. M. Linke, D. Maslov, M. Roetteler, S. Debnath, C. Figgatt, K. A. Landsman, K. Wright, and C. Monroe, Experimental comparison of two quantum computing architectures, Proceedings of the National Academy of Sciences 114, 3305-3310 (2017).

Y. Nam and D. Maslov, Low-cost quantum circuits for classically intractable instances of the Hamiltonian dynamics simulation problem, npj Quantum Information (2019), 10.1038/s41534-019-0152-0.

D. Maslov, Y. Nam, and J. Kim, An Outlook for Quantum Computing, Proceedings of the IEEE 107, 5 (2019).

N. Grzesiak, R. Blumel, K. Wright, K. M. Beck, N. C. Pisenti, M. Li, V. Chaplin, J. M. Amini, S. Debnath, J.-S. Chen, and et al., Efficient arbitrary simultaneously entangling gates on a trapped-ion quantum computer, Nature Communications 11 (2020), 10.1038/s41467-020-16790-9.

L. M. K. Vandersypen and I. L. Chuang, NMR techniques for quantum control and computation, Rev. Mod. Phys. 76, 1037 (2005).

J. T. Merrill and K. R. Brown, Progress in compensating pulse sequences for quantum computation, in Quantum Information and Computation for Chemistry (John Wiley & Sons, Ltd, 2014) pp. 241-294.

M. Cetina, L. Egan, C. A. Noel, M. L. Goldman, A. R. Risinger, D. Zhu, D. Biswas, and C. Monroe, Quantum Gates on Individually-Addressed Atomic Qubits Subject to Noisy Transverse Motion, arXiv:2007.06768 (2020).

A. West, R. Putnam, W. Campbell, and P. Hamilton, Tunable transverse spin-motion coupling for quantum information processing, arXiv:2007.10437 (2020).

E. Brion, L. H. Pedersen, and K. Mølmer, Adiabatic elimination in a lambda system, Journal of Physics A: Mathematical and Theoretical 40, 1033 (2007).

D. F. V. James, Quantum dynamics of cold trapped ions with application to quantum computation, Applied Physics B 66, 181 (1998).

K. Mølmer and A. Sørensen, Multiparticle Entanglement of Hot Trapped Ions, Phys. Rev. Lett. 82, 1835 (1999).

A. Sørensen and K. Mølmer, Quantum Computation with Ions in Thermal Motion, Phys. Rev. Lett. 82, 1971 (1999).

J. I. Cirac and P. Zoller, Quantum Computations with Cold Trapped Ions, Phys. Rev. Lett. 74, 4091 (1995).

D. J. Wineland, C. Monroe, W. M. Itano, D. Leibfried, B. E. King, and D. M. Meekhof, Experimental Issues in Coherent Quantum-State Manipulation of Trapped Atomic Ions, J. Res. Natl. Inst. Stand. Technol. 103, 259 (1998).

R. Blümel, N. Grzesiak, and Y. S. Nam, Power-optimal, stabilized entangling gate between trapped-ion qubits, arXiv:1905.09292 (2019).

K. Wright, K. M. Beck, S. Debnath, J. M. Amini, Y. Nam, N. Grzesiak, J.-S. Chen, N. C. Pisenti, M. Chmielewski, C. Collins, K. M. Hudek, J. Mizrahi, J. D. Wong-Campos, S. Allen, J. Apisdorf, P. Solomon, M. Williams, A. M. Ducore, A. Blinov, S. M. Kreikemeier, V. Chaplin, M. Keesan, C. Monroe, and J. Kim, Benchmarking an 11-qubit quantum computer, Nature Communications 10, 5464 (2019).

S. Olmschenk, K. C. Younge, D. L. Moehring, D. N. Matsukevich, P. Maunz, and C. Monroe, Manipulation and detection of a trapped Yb+ hyperfine qubit, Phys. Rev. A 76, 052314 (2007).

I. A. Boldin, A. Kraft, and C. Wunderlich, Measuring Anomalous Heating in a Planar Ion Trap with Variable Ion-Surface Separation, Phys. Rev. Lett. 120, 023201 (2018).

R. Tycko, Broadband Population Inversion, Phys. Rev. Lett. 51, 775 (1983).

Y.-C. Shen and G.-D. Lin, Scalable quantum computing stabilised by optical tweezers on an ion crystal, New Journal of Physics 22, 053032 (2020).

V.M. Schafer et al. "Fast Quantum Logic Gates with Trapped-Ion Qubits", Cornell University Library. Sep. 20, 2017.

Bentley Christopher D. B. Et al. "Numeric Optimization for Configurable, Parallel, Error-Robust Entangling Gates in Large Ion Registers", Advanced Quantum Technologies. vol. 3, No. 11, Jul. 23, 2020.

Lee Aaron Christopher, "Engineering a Quantum Many-Body Hamiltonian with Trapped Ions" Aug. 9, 2016, Digital Repository at the University of Maryland.

International Search Report dated Dec. 22, 2021 for Application No. PCT/US2021/050755.

European Patent Application No. 21787269.6, Office Action dated May 10, 2024, 9 pages.

* cited by examiner

# IMPROVING QUANTUM GATE INFIDELITY IN TRAPPED ION QUANTUM COMPUTERS

CROSS-REFERENCE TO RELATED APPLICATIONS

This application claims priority to U.S. Provisional Patent Application Ser. No. 63/083,469, filed on Sep. 25, 2020, which is incorporated by reference herein.

BACKGROUND

Field

The present disclosure generally relates to a method of performing a quantum gate operation in an ion trap quantum computer, and more specifically, to a method for reliably performing quantum computation over a long chain of ions that creates an all-to-all qubit connectivity.

Description of the Related Art

Trapped ions represent a promising platform for universal quantum computation, and high-fidelity quantum gate operations have already been demonstrated on short chains of one or two trapped ions. However, further improvements to fidelity of quantum gate operations and the number of trapped ions (i.e., qubits) are necessary to bridge the gap between these early systems of short chains of trapped ions and a commercially viable quantum computer. To this end, several pathways have been proposed and demonstrated in the art, where trapped ions are separated in space at a given time during a quantum program execution. They, however, come at the cost of sparse qubit connectivity between the qubits, since a direct implementation of qubit-to-qubit interaction between an arbitrary pair of qubits is impossible, which is a known source of overhead in performing quantum computation. They also complicate the hardware design, making high-fidelity gate operations more challenging.

Therefore, there is a need for a method for reliably performing quantum computation over a long chain of trapped ions that creates an all-to-all qubit connectivity.

SUMMARY

Embodiments of the disclosure include a method of performing a quantum gate operation in an ion trap quantum computing system. The method includes identifying one or more error mechanisms that cause a quantum computational error in a quantum gate operation on a first trapped ion of an ion chain comprising a plurality of trapped ions, wherein the quantum gate operation is performed by applying a first Raman laser beam and a second Raman laser beam that are configured to cause a Raman transition in the first trapped ion in the ion chain and a coupling between the first trapped ion and one or more axial motional modes of the ion chain, computing a first amplitude of the first Raman laser beam, and a second amplitude of the second Raman laser beam such that the effect of the identified one or more error mechanisms is accounted for, and applying the first Raman laser beam having the computed first amplitude and the second Raman laser beam having the computed second amplitude on the first trapped ion to perform the quantum gate operation on the first trapped ion.

Embodiments of the disclosure further include an ion trap quantum computing system. The ion trap quantum computing system includes a quantum processor comprising an ion chain including a plurality of trapped ions, each trapped ion having two hyperfine states, one or more lasers configured to emit a first Raman laser beam and a second Raman laser beam, which is provided to the ion chain in the quantum processor, a classical computer configured to perform operations including identifying one or more error mechanisms that cause a quantum computational error in a quantum gate operation on a first trapped ion of the ion chain, wherein the quantum gate operation is performed by applying the first Raman laser beam and the second Raman laser beam that are configured to cause a Raman transition in the first trapped ion in the ion chain and a coupling between the first trapped ion and one or more axial motional modes of the ion chain, and computing a first amplitude of the first Raman laser beam, and a second amplitude of the second Raman laser beam such that the effect of the identified one or more error mechanisms is accounted for, and a system controller configured to execute a control program to control the one or more lasers to perform operations on the quantum processor, the operations including applying the first Raman laser beam having the computed first amplitude and the second Raman laser beam having the computed second amplitude on the first trapped ion to perform the quantum gate operation on the first trapped ion, and measuring population of qubit states in the quantum processor.

Embodiments of disclosure also include an ion trap quantum computing system. The ion trap quantum computing system includes a classical computer, a quantum processor comprising an ion chain including a plurality of trapped ions, each trapped ion having two hyperfine states, a system controller configured to execute a control program to control the one or more lasers configured to emit a first Raman laser beam and a second Raman laser beam, which is provided to the ion chain in the quantum processor, and non-volatile memory having a number of instructions stored therein which, when executed by one or more processors, causes the ion trap quantum computing system to perform operations including identifying, by the classical computer, one or more error mechanisms that cause a quantum computational error in a quantum gate operation on a first trapped ion of the ion chain, wherein the quantum gate operation is performed by applying the first Raman laser beam and the second Raman laser beam that are configured to cause a Raman transition in the first trapped ion in the ion chain and a coupling between the first trapped ion and one or more axial motional modes of the ion chain, computing, by the classical computer, a first amplitude of the first Raman laser beam, and a second amplitude of the second Raman laser beam such that the effect of the identified one or more error mechanisms is accounted for, applying, by the system controller, the first Raman laser beam having the computed first amplitude and the second Raman laser beam having the computed second amplitude on the first trapped ion to perform the quantum gate operation on the first trapped ion, measuring, by the system controller, population of qubit states in the quantum processor, and outputting, by the classical computer, the measured population of qubit states in the quantum processor.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
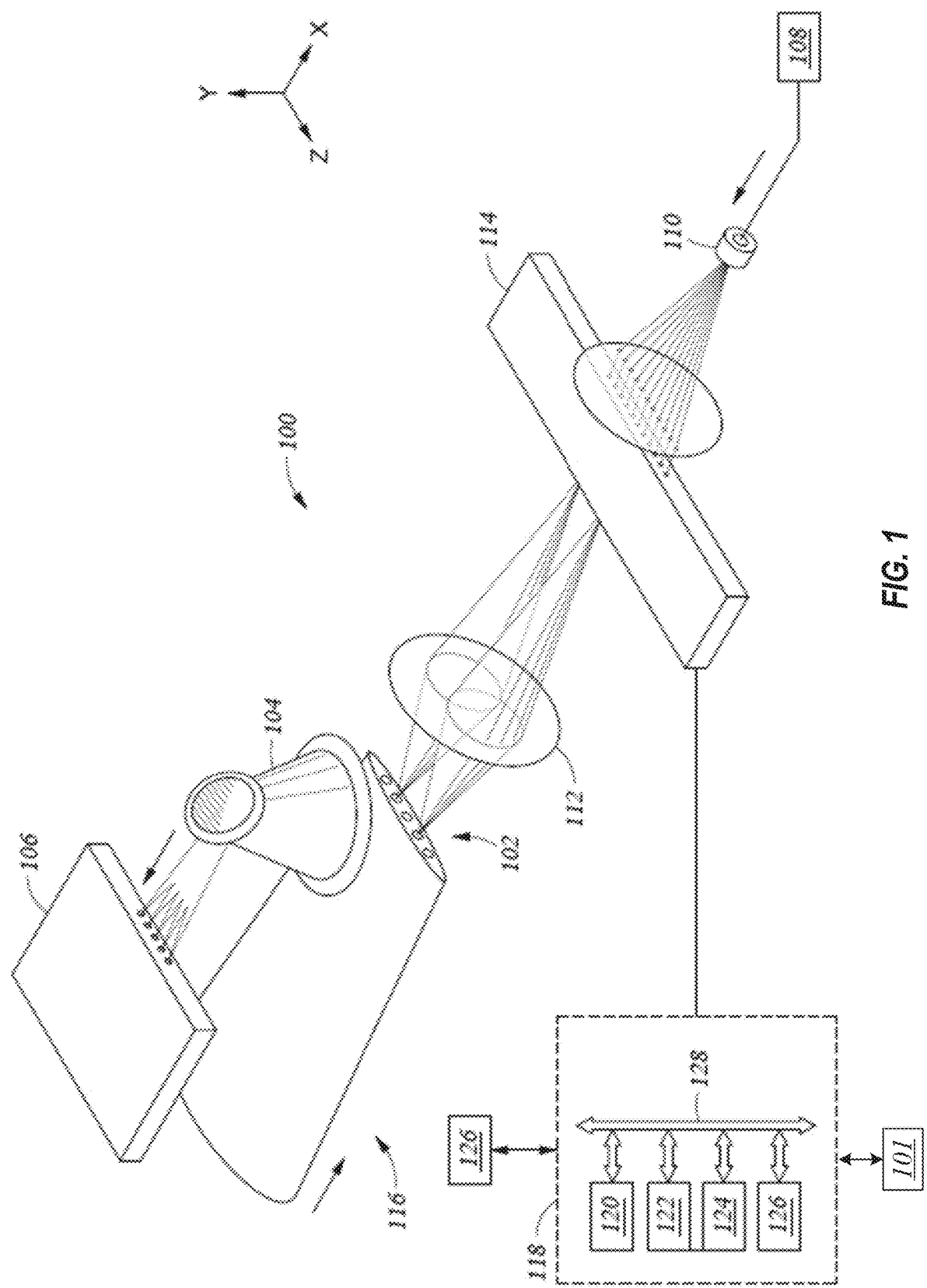
FIG. 1 is a partial view of an ion trap quantum computer according to one embodiment.

To facilitate understanding, identical reference numerals have been used, where possible, to designate identical elements that are common to the figures. In the figures and the following description, an orthogonal coordinate system including an X-axis, a Y-axis, and a Z-axis is used. The directions represented by the arrows in the drawing are assumed to be positive directions for convenience. It is contemplated that elements disclosed in some embodiments may be beneficially utilized on other implementations without specific recitation.

DETAILED DESCRIPTION

Embodiments described herein are generally related to a method for reliably performing quantum computation over a long chain of trapped ions that creates an all-to-all qubit connectivity (i.e., all qubits are coupled over both small and large distances). The method includes identifying mechanisms by which quantum computational errors may incur, and addressing the identified mechanisms. Embodiments of the disclosure provided herein provide a generalized Hamiltonian that describes an ion trap quantum computer system, in which two-photon Raman transitions are used to implement quantum gate operations on a chain of trapped ions. Such a generalized Hamiltonian framework provides tools to identify mechanisms that cause errors in quantum gate operations, such as misalignment, defocus, or distortion of a Raman laser beam, and a displacement of trapped ions from their equilibrium locations due the ion-laser interaction. The method described herein for identifying mechanisms for quantum computational errors and addressing the identified mechanism that caused the quantum computational errors, which has been validated by comparing simulation results of fidelity of quantum gate operations based on the method with experimental results, is useful in reliably performing quantum computation over a long chain of trapped ions (e.g., 100 or more trapped ions). In some embodiments, the method further includes applying compensating pulse sequences to increase fidelity of quantum gate operations.

The methods provided herein enables systematic and quantitative error analysis for a variety of hardware implementations of an ion trap quantum computer system and provides guidance in devising appropriate error mitigation strategies.

I. General Hardware Configurations

FIG. 1 is a partial view of an ion trap quantum computer system, or system 100, according to one embodiment. The system 100 includes a classical (digital) computer 101, a system controller 118 and a quantum register that is a chain 102 of trapped ions that extend along the Z-axis. In the example shown in FIG. 1, for simplicity of discussion purposes, five trapped ions are shown. However, the chain 102 can include more than five trapped ions, such as 100 or more trapped ions. Each ion in the chain 102 of trapped ions is an ion having a nuclear spin I and an electron spin s such that the difference between the nuclear spin I and the electron spin s is zero, such as a positive ytterbium ion, $^{171}Yb^+$, a positive barium ion $^{133}Ba^+$, a positive cadmium ion $^{111}Cd^+$ or $^{113}Cd^+$, which all have a nuclear spin I=½ and the $^2S_{1/2}$ hyperfine states. In some embodiments, all ions in the chain 102 of trapped ions are the same species and isotope (e.g., $^{171}Yb^+$). In some other embodiments, the chain 102 of trapped ions includes one or more species or isotopes (e.g., some ions are $^{171}Yb^+$ and some other ions are $^{133}Ba^+$). In yet additional embodiments, the chain 102 of trapped ions may include various isotopes of the same species (e.g., different isotopes of Yb, different isotopes of Ba). The ions in the chain 102 of trapped ions are individually addressed with separate laser beams.

The classical computer 101 includes a central processing unit (CPU), memory, and support circuits (or I/O). The memory is connected to the CPU, and may be one or more of a readily available memory, such as a read-only memory (ROM), a random access memory (RAM), floppy disk, hard disk, or any other form of digital storage, local or remote. Software instructions, algorithms and data can be coded and stored within the memory for instructing the CPU. The support circuits (not shown) are also connected to the CPU for supporting the processor in a conventional manner. The support circuits may include conventional cache, power supplies, clock circuits, input/output circuitry, subsystems, and the like.

An imaging objective 104, such as an objective lens with a numerical aperture (NA), for example, of 0.37, collects fluorescence along the Y-axis from the ions and maps each ion onto a multi-channel photo-multiplier tube (PMT) 106 for measurement of individual ions. Non-copropagating Raman laser beams from a laser 108, which are provided along the X-axis, perform operations on the ions. A diffractive beam splitter 110 creates an array of static Raman beams 112 that are individually switched using a multi-channel acousto-optic modulator (AOM) 114 and is configured to selectively act on individual ions. A global Raman laser beam 116 illuminates ions at once. In some embodiments, individual Raman laser beams (not shown) each illuminate individual ions. The system controller (also referred to as a "RF controller") 118 controls the AOM 114. The system controller 118 includes a central processing unit (CPU) 120, a read-only memory (ROM) 122, a random access memory (RAM) 124, a storage unit 126, and the like. The CPU 120 is a processor of the RF controller 118. The ROM 122 stores various programs and the RAM 124 is the working memory for various programs and data. The storage unit 126 includes a nonvolatile memory, such as a hard disk drive (HDD) or a flash memory, and stores various programs even if power is turned off. The CPU 120, the ROM 122, the RAM 124, and the storage unit 126 are interconnected via a bus 128. The RF controller 118 executes a control program which is stored in the ROM 122 or the storage unit 126 and uses the RAM 124 as a working area. The control program will include one or more software applications that include program code (e.g., instructions) that may be executed by a processor in order to perform various functionalities associated with receiving and analyzing data and controlling any and all aspects of the methods and hardware used to create the ion trap quantum computer system 100 discussed herein.

Figure 2:
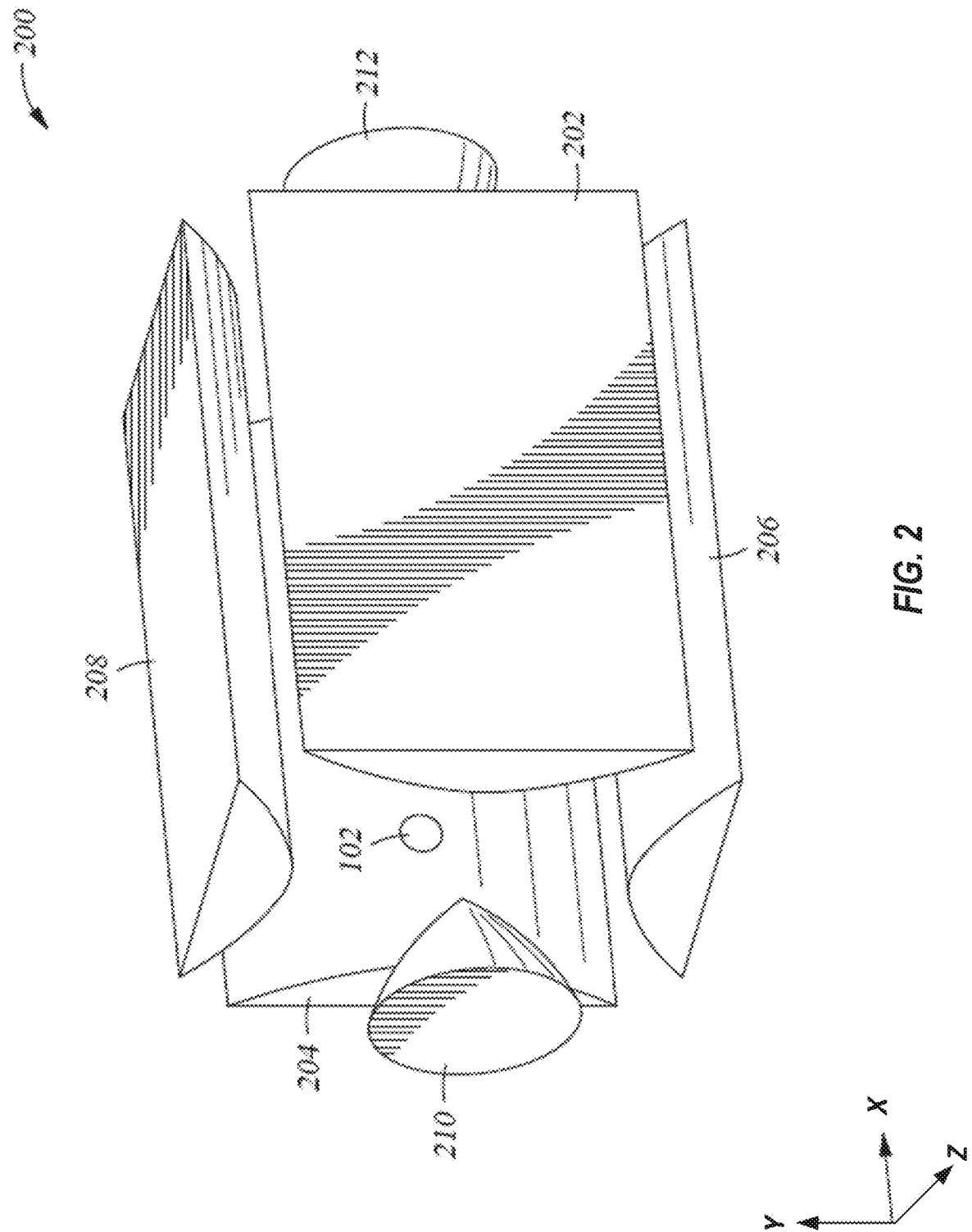
FIG. 2 depicts a schematic view of an ion trap for confining ions in a chain according to one embodiment.

FIG. 2 depicts a schematic view of an ion trap 200 (also referred to as a Paul trap) for confining ions in the chain 102 according to one embodiment. The confining potential is exerted by both static (DC) voltage and radio frequency (RF) voltages. A static (DC) voltage Vs is applied to end-cap electrodes 210 and 212 to confine the ions along the X-axis (also referred to as an "axial direction" or "vertical direction"). The ions in the chain 102 are nearly evenly distributed in the axial direction due to the Coulomb interaction between the ions. In some embodiments, the ion trap 200 includes four hyperbolically-shaped electrodes 202, 204, 206, and 208 extending along the X-axis.

During operation, a sinusoidal voltage $V_1$ (with an amplitude $V_{RF}/2$) is applied to the opposing pair of electrodes 202, 204 and a sinusoidal voltage $V_2$ with a phase shift of 180° from the sinusoidal voltage $V_1$ (and the amplitude $V_{RF}/2$) is applied to the other opposing pair of electrodes 206, 208 at a driving frequency $\omega_{RF}$, generating a quadrupole potential. In some embodiments, a sinusoidal voltage is only applied to one opposing pair of the electrodes 202, 204, and the other opposing pair of the electrodes 206, 208 is grounded. The quadrupole potential creates an effective confining force in the Y-Z plane perpendicular to the X-axis (also referred to as a "non-axial direction" or "transverse direction") for each of the trapped ions, which is proportional to the distance from a saddle point (i.e., a position in the axial direction (X-direction)) at which the RF electric field vanishes. The motion in the radial direction (i.e., direction in the Y-Z plane) of each ion is approximated as a harmonic oscillation (referred to as secular motion) with a restoring force towards the saddle point in the radial direction and can be modeled by spring constants $k_y$ and $k_z$, respectively. In some embodiments, the spring constants in the radial direction are modeled as equal when the quadrupole potential is symmetric in the radial direction. However, undesirably in some cases, the motion of the ions in the radial direction may be distorted due to some asymmetry in the physical trap configuration, a small DC patch potential due to inhomogeneity of a surface of the electrodes, or the like and due to these and other external sources of distortion the ions may lie off-center from the saddle points.

II. Trapped Ion Configuration and Quantum Bit Information

Figure 3A:
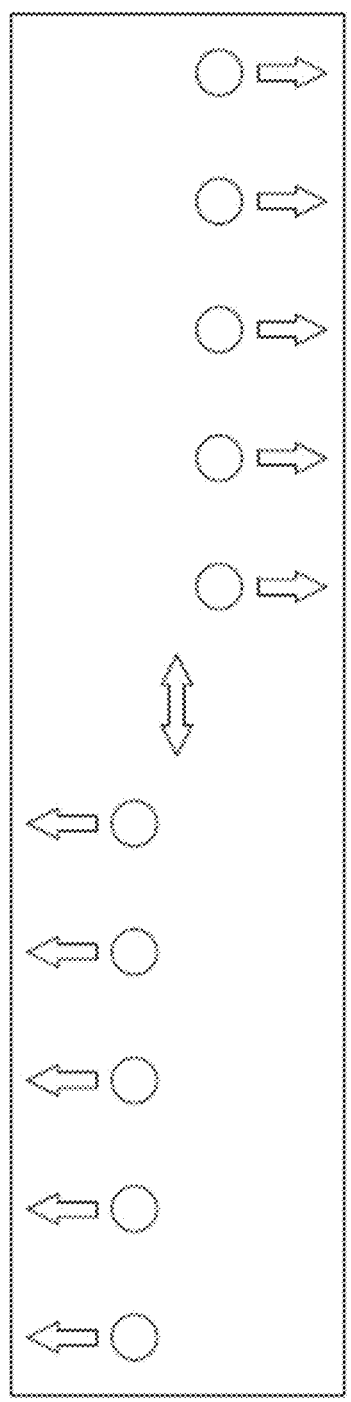
FIGS. 3A, 3B, and 3C depict a few schematic structures of collective transverse motional mode of a chain of five trapped ions.
Figure 3B:
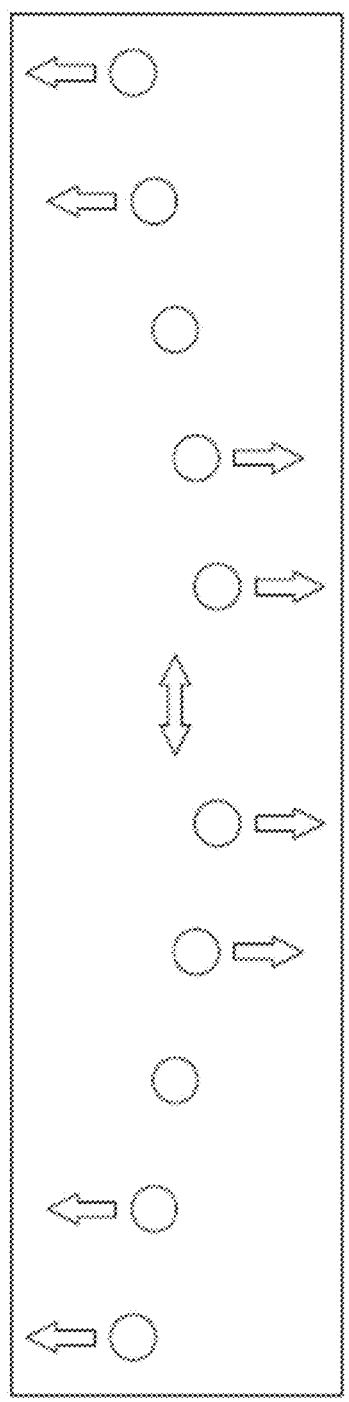
Figure 3C:
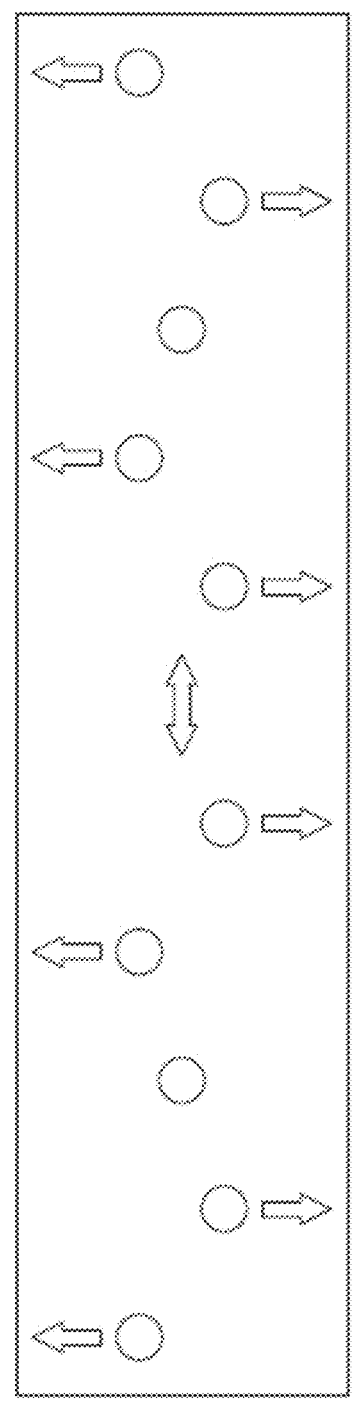

FIGS. 3A, 3B, and 3C depict a few schematic structures of collective transverse motional modes of a chain 102 of five trapped ions, for example. Here, the confining potential due to a static voltage Vs applied to the end-cap electrodes 210 and 212 is weaker compared to the confining potential in the radial direction. The collective motional modes of the chain 102 of trapped ions in the transverse direction are determined by the Coulomb interaction between the trapped ions combined with the confining potentials generated by the ion trap 200. The trapped ions undergo collective transversal motions (referred to simply as "motional modes"), where each mode has a distinct energy (or equivalently, a frequency) associated with it. A motional mode having the p-th lowest energy is hereinafter referred to as $|n\rangle_p$, where n denotes the number of motional quanta (in units of energy excitation, referred to as phonons) in the motional mode, and the number of motional modes P in a given transverse direction is equal to the number of trapped ions N in the chain 102. FIGS. 3A-3C schematically illustrate examples of different types of motional modes that may be experienced by five trapped ions that are positioned in a chain 102. FIG. 3A is a schematic view of a common motional mode (also referred to as "center-of-mass mode") $|n\rangle_p$ having the highest energy, where P is the number of motional modes. In the common motional mode $|n\rangle_p$, all ions oscillate in phase in the transverse direction. FIG. 3B is a schematic view of a tilt motional mode $|n\rangle_{P-1}$ which has the second highest energy. In the tilt motional mode, ions on opposite ends move out of phase in the transverse direction (i.e., in opposite directions). FIG. 3C is a schematic view of a higher-order motional mode $|n\rangle_{P-3}$ which has a lower energy than that of the tilt motional mode $|n\rangle_{P-1}$, and in which the ions move in a more complicated mode pattern. For those of ordinary skill in the art, it should be clear a similar description is applicable to axial motional modes.

It should be noted that the particular configuration described above is just one among several possible examples of a trap for confining ions according to the present disclosure and does not limit the possible configurations, specifications, or the like of traps according to the present disclosure. For example, the geometry of the electrodes is not limited to the hyperbolic electrodes described above. In other examples, a trap that generates an effective electric field causing the motion of the ions in the radial direction as harmonic oscillations may be a multi-layer trap in which several electrode layers are stacked and an RF voltage is applied to two diagonally opposite electrodes, or a surface trap in which all electrodes are located in a single plane on a chip. Furthermore, a trap may be divided into multiple segments, adjacent pairs of which may be linked by shuttling one or more ions, or coupled by photon interconnects. A trap may also be an array of individual trapping regions arranged closely to each other on a micro-fabricated ion trap chip. In some embodiments, the quadrupole potential has a spatially varying DC component in addition to the RF component described above.

Figure 4:
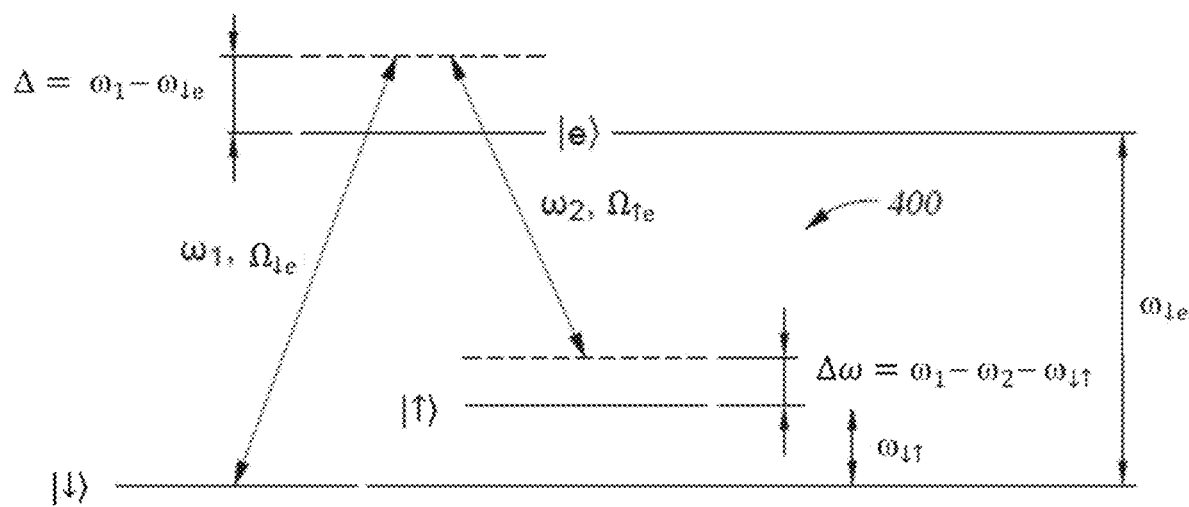
FIG. 4 depicts a schematic energy diagram of each ion in a chain of trapped ions according to one embodiment.

FIG. 4 depicts a schematic energy diagram 400 of each ion in the chain 102 of trapped ions according to one embodiment. Each ion in the chain 102 of trapped ions is an ion having a nuclear spin I and an electron spin s such that the difference between the nuclear spin I and the electron spin s is zero. In one example, each ion may be a positive ytterbium ion, $^{171}Yb^+$, which has a nuclear spin $I=\frac{1}{2}$ and the $^2S_{1/2}$ hyperfine states (i.e., two electronic states) with an energy split corresponding to a frequency difference (referred to as a "carrier frequency") of $\omega_{01}/2\pi=12.642812$ GHz. In other examples, each ion may be a positive barium ion $^{133}Ba^+$, a positive cadmium ion $^{111}Cd^+$ or $^{113}Cd^+$, which all have a nuclear spin $I=\frac{1}{2}$ and the $^2S_{1/2}$ hyperfine states. A qubit is formed with the two hyperfine states, denoted as $|\downarrow\rangle$ and $|\uparrow\rangle$. Hereinafter, the terms "hyperfine states," "internal hyperfine states," and "qubits" may be interchangeably used to represent $|\downarrow\rangle$ and $|\uparrow\rangle$. Each ion may be cooled (i.e., kinetic energy of the ion may be reduced) to near the motional ground state $|0\rangle_p$, for any motional mode p with no phonon excitation (i.e., n=0) by known laser cooling methods, such as Doppler cooling or resolved sideband cooling, and then the qubit state prepared in the hyperfine ground state $|\downarrow\rangle$ by optical pumping.

An individual qubit state of each trapped ion may be manipulated by, for example, a mode-locked laser at 355 nanometers (nm) via the excited $^2P_{1/2}$ level (denoted as $|e\rangle$). As shown in FIG. 4, a laser beam from the laser may be split into a pair of non-copropagating laser beams (a first laser beam with frequency $\omega_1$ and a second laser beam with frequency $\omega_2$) in the Raman configuration, and detuned by a one-photon transition detuning frequency $\Delta=\omega_1-\omega_{\downarrow e}$ with respect to the transition frequency $\omega_{\downarrow e}$ between $|\downarrow\rangle$ and $|e\rangle$, as illustrated in FIG. 4. A two-photon transition detuning frequency $\delta$ includes adjusting the amount of energy that is provided to the trapped ion by the first and second laser beams, which when combined is used to cause the trapped ion to transfer between the hyperfine states $|\downarrow\rangle$ and $|\uparrow\rangle$. When the one-photon transition detuning frequency $\Delta$ is much larger than the two-photon transition detuning frequency (also referred to simply as "detuning frequency") $\Delta\omega=\omega_1-\omega_2-\omega_{\uparrow\downarrow}$ (hereinafter denoted as $\pm\mu$, $\mu$ being a positive value), single-photon Rabi frequencies $\Omega_{\downarrow e}(t)$ and $\Omega_{\uparrow e}(t)$ (which are time-dependent, and are determined by amplitudes and phases of the first and second laser beams), at which Rabi flopping between states $|\downarrow\rangle$ and $|e\rangle$ and between states $|\uparrow\rangle$ and $|e\rangle$ respectively occur, and a spontaneous emission rate from the excited state $|e\rangle$. Rabi flopping between the two hyperfine states $|\downarrow\rangle$ and $|\uparrow\rangle$ (referred to as a "carrier transition") is induced at the two-photon Rabi frequency (also referred to as the "Rabi rate") $\Omega(t)$. The two-photon Rabi frequency $\Omega(t)$ has an intensity (i.e., absolute value of amplitude) that is proportional to $\Omega_{\downarrow e}\Omega_{\uparrow e}/2\Delta\omega$, where $\Omega_{\downarrow e}$ and $\Omega_{\uparrow e}$ are the single-photon Rabi frequencies due to the first and second laser beams, respectively. Hereinafter, this set of non-copropagating laser beams in the Raman configuration to manipulate internal hyperfine states of qubits (qubit states) may be referred to as a "non-copropagating pulse." When the propagations are opposite to each other, the set of laser beams may be referred to as "counter-propagating pulse." For those of ordinary skill in the art, it should be clear a related approach can be employed to derive a transition between $|\downarrow\rangle$ and $|\uparrow\rangle$ using the propagations in the same direction, which is referred to as a "co-propagating pulse" hereinafter. The resulting time-dependent pattern of the two-photon Rabi frequency $\Omega(t)$, whenever contextually clear, may be referred to as an "amplitude" of a pulse of any propagation set-up, which are illustrated and further described below. The detuning frequency $\Delta\omega=\omega_1-\omega_2-\omega_{\downarrow\uparrow}$ may be referred to as detuning frequency $\Delta\omega=\omega_1-\omega_2-\omega_{\downarrow\uparrow}$ of the composite pulse or detuning frequency of the pulse. The amplitude of the two-photon Rabi frequency $\Omega(t)$, which is determined by amplitudes of the first and second laser beams, may be referred to as an "amplitude" of the composite pulse.

It should be noted that the particular atomic species used in the discussion provided herein is just one example of atomic species which has stable and well-defined two-level energy structures when ionized and an excited state that is optically accessible, and thus is not intended to limit the possible configurations, specifications, or the like of an ion trap quantum computer according to the present disclosure. For example, other ion species include alkaline earth metal ions (Bet, Cat, $Sr^+$, $Mg^+$, and $Ba^+$) or transition metal ions ($Zn^+$, $Hg^+$, $Cd^+$).

Figure 5:
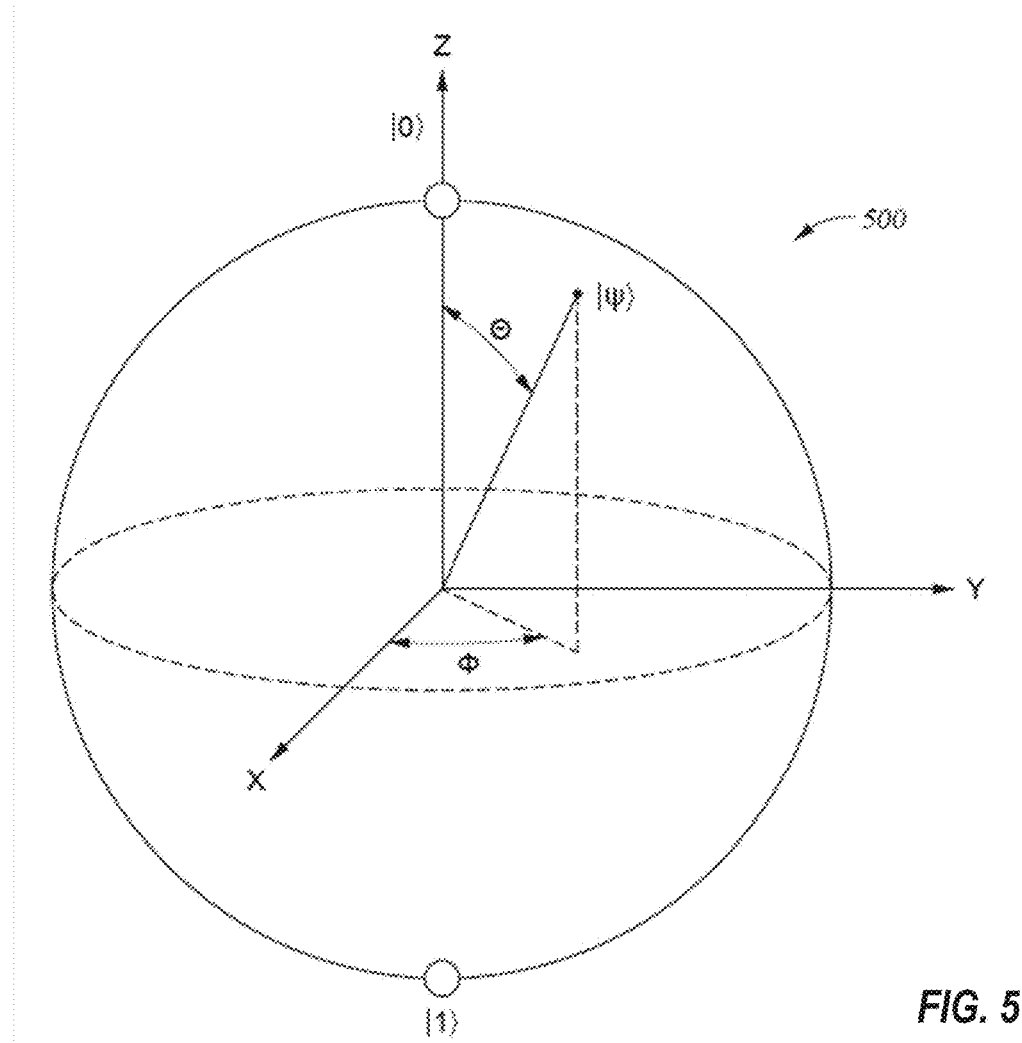
FIG. 5 depicts a qubit state of an ion represented as a point on a surface of the Bloch sphere.

FIG. 5 is provided to help visualize a qubit state of an ion represented as a point on the surface of the Bloch sphere 500 with an azimuthal angle $\phi$ and a polar angle $\theta$. Application of the composite pulse as described above, causes Rabi flopping between the qubit state $|\downarrow\rangle$ (represented as the north pole of the Bloch sphere) and $|\uparrow\rangle$ (the south pole of the Bloch sphere) to occur. Adjusting time duration and amplitudes of the composite pulse flips the qubit state from $|\downarrow\rangle$ to $|\uparrow\rangle$ (i.e., from the north pole to the south pole of the Bloch sphere), or the qubit state from $|\uparrow\rangle$ to $|\downarrow\rangle$ (i.e., from the south pole to the north pole of the Bloch sphere). This application of the composite pulse is referred to as a "n-pulse". Further, by adjusting time duration and amplitudes of the composite pulse, the qubit state $|\uparrow\rangle$ may be transformed to a superposition state $|\downarrow\rangle+|\uparrow\rangle$, where the two qubit states $|\downarrow\rangle$ and $|\uparrow\rangle$ are added and equally-weighted in-phase (a normalization factor of the superposition state is omitted hereinafter without loss of generality), and the qubit state $|\uparrow\rangle$ to a superposition state $|\downarrow\rangle-|\uparrow\rangle$, where the two qubit states $|\uparrow\rangle$ and $|\uparrow\rangle$ are added equally-weighted but out of phase. This application of the composite pulse is referred to as a "$\pi/2$-pulse". More generally, a superposition of the two qubit states $|\uparrow\rangle$ and $|\uparrow\rangle$ that are added and equally-weighted is represented by a point that lies on the equator of the Bloch sphere. For example, the superposition states $|\downarrow\rangle\pm|\uparrow\rangle$ correspond to points on the equator with the azimuthal angle $\phi$ being zero and $\pi$, respectively. The superposition states that correspond to points on the equator with the azimuthal angle $\phi$ are denoted as $|\uparrow\rangle+e^{i\phi}|\uparrow\rangle$ (e.g., $|\downarrow\rangle\pm i|\uparrow\rangle$ for $\phi=\pm\pi/2$). Transformation between two points on the equator (i.e., a rotation about the Z-axis on the Bloch sphere) can be implemented by shifting phases of the composite pulse.

In an ion trap quantum computer, the motional modes may act as a data bus to mediate entanglement between two qubits. That is, each of the two qubits is entangled with the motional modes, and then the entanglement is transferred to an entanglement between the two qubits by using motional sideband excitations. For those of ordinary skill in the art, it should be clear this is achieved by considering each qubit's individual evolution under the action of the detuned laser pulses either simultaneously or sequentially, depending on the entangling gate protocol of choice. Thus, it suffices to investigate an ion-beam interaction of an ion in an ion chain to provide a detailed, complete description of the two-qubit entangling operator for a protocol of any choice.

III. General Description of Ion Trap Quantum Computer System

An ion trap quantum computer system, such as the system 100, that includes two non-copropagating Raman laser beams, such as the Raman beams 112, for selectively accessing individual ions in the chain 102 may be described by an effective Hamiltonian H. The effective Hamiltonian H describes coupling between the motional degrees of freedom (i.e., motional modes of the chain 102) and the internal degree of freedom (i.e., the internal hyperfine states $\{|\downarrow\rangle, |\uparrow\rangle\}$) of the ions in the chain 102 through the Raman beams. This effective Hamiltonian H can be separated into two parts as $$H = H_0 + H_I, \qquad (1)$$

where $H_0$ describes the internal and the motional degrees of freedom for the ions in the chain 102 independently and H describes the light-matter interaction that couples the internal and the motional degrees of freedom for the ions in the chain 102. Treating the laser field of the Raman beams classically, while treating the rest of the system 100 quantum mechanically, together with the dipole approximation, the interaction Hamiltonian $H_I$ can simply be written as $$H_I = -\sum_{k=1}^{N} \vec{E} \cdot \vec{d}_k, \quad (2)$$

where $\vec{E}$ is the electric field and $\vec{d}_k$ is the dipole operator of the kth ion out of N total number of ions in the chain 102. For the independent Hamiltonian $H_0$, the ions are considered to be confined in a Paul trap, such as the ion trap 200 and aligned in the chain 102. With the approximation of the motional modes as harmonic oscillations as described above and consideration of an effective two-level system for the internal degrees of freedom of each ion as a qubit, the Hamiltonian $H_0$ reduces to $$H_0 = \sum_{k=1}^{N} \frac{\hbar \omega_k^{qbt}}{2} \hat{\sigma}_k^z + \sum_{p=1}^{3N} \hbar \omega_p \left( \hat{a}_p^\dagger \hat{a}_p + \frac{1}{2} \right), \quad (3)$$

where $\hbar$ is the reduced Planck constant, $\omega_k^{qbt}$ is the effective qubit angular frequency for the kth ion, $\hat{\sigma}_k^\alpha$ with $\alpha=$x, y, or z is the Pauli matrix along the $\alpha$-axis, $\omega_p$ is the normal motional mode frequency of the pth normal motional mode with Fock state creation and annihilation (also referred to as "ladder") operators $\hat{a}_p^\dagger$ and $\hat{a}_p$.

Hereinafter, only two Raman beams (b=1, 2) that drive qubit transitions on a particular ion k are considered, and the ion index k is dropped wherever contextually clear for simplicity. The electric field near the ion is given by $$\vec{E} = \vec{E}_1 + \vec{E}_2, \quad (4)$$

where the individual electric field $\vec{E}_b$ of the Raman beam (b=1 or 2) can be written as $$\vec{E}_b = \hat{\epsilon}_b e^{i\omega_b t} E_b(\vec{r}_b) e^{i\Phi_b(\vec{r}_b)} + h.c., \quad (5)$$

where $\hat{\epsilon}_b$ is the polarization vector, $\omega_b$ is the angular frequency, $E_b$ and $\Phi_b$ are real functions of the ion position in each of the beam propagation coordinates $\vec{r}_b$, and h. c. denotes the Hermitian conjugate. After the standard adiabatic elimination of the excited internal states of the ion, the individual summand $H_{I,k}$ of the interaction Hamiltonian $H_I$ in (2) can be approximated as $$H_{I,k} = \overline{D} e^{i(\omega^{qbt} + \Delta\omega)t} E_1(\vec{r}_1) e^{i\Phi_1(\vec{r}_1)} E_2(\vec{r}_2) e^{-i\Phi_2(\vec{r}_2)} \hat{\sigma}_k + h.c., \quad (6)$$

where $\overline{D}$ is an effective dipole constant, $\Delta\omega$ is the effective two-photon transition detuning of the Raman transition from the qubit transition, and $\hat{\sigma}_k$ is a qubit spin operator which depends on the details of the Raman transition scheme. Here, without loss of generality, it is assumed $\omega_1-\omega_2=\omega^{qbt}+\Delta\omega$, or in other words, the transition from qubit state $|\downarrow\rangle$ to $|\uparrow\rangle$ requires absorption of a photon from Raman beam 1 and emission of a photon from Raman beam 2.

The coupling of the Raman beam to the motional modes of the ion is embedded in the $\vec{r}_b$ dependent terms in (6). To rewrite them in terms of the normal motional mode operators $\hat{a}_p$ and $\hat{a}_p^\dagger$, the ion position with respect to each Raman beam is first written as $$\vec{r}_b = \vec{r}_b^{(0)} + \sum_{\alpha_b} \zeta_{\alpha_b} \hat{e}_{\alpha_b}, \quad (7)$$

where $\vec{r}_b^{(0)}$ is the equilibrium ion position in the beam coordinate $\{x_b, y_b, z_b\}$ and $\hat{e}_{\alpha_b}$ is the unit vector along the direction of the axis $\alpha_b=x_b, y_b$, or $z_b$. Then, the terms $E_b(\vec{r}_b)$ and $e^{\pm i\Phi_b(\vec{r}_b)}$ can be expanded near $\vec{r}_b^{(0)}$ with respect to an ion excursion (i.e., ion motion from the equilibrium ion position $\vec{r}_b^{(0)} \zeta_{\alpha_b}$. Lastly, the ion excursion $\zeta_{\alpha_b}$ can be quantized and rewritten in terms of the normal motional mode operators $\hat{a}_p$ and $\hat{a}_p^\dagger$, as $$\zeta_{\alpha_b} = \sum_{p=1}^{3N} \zeta_p^{(0)} v_p^{\alpha_b} (\hat{a}_p + \hat{a}_p^\dagger), \quad (8)$$

where $\zeta_p^{(0)} = \sqrt{\hbar/2m\omega_p}$ is the spread of the zero-point wavefunction of mode p with the mass m of the ion and $v_p^{\alpha_b}$ is a matrix element of the inverse of the motional mode vector matrix. A full accounting of the ion-laser interaction can then be made by expanding the appropriate form of $E_b e^{\pm i\Phi_b}$ for a given experimental context.

IV. Application to Elliptical Astigmatic Gaussian Beams

In this section, the Gaussian beam, a prototypical example used widely in the trapped-ion quantum computing community, is considered to derive a suite of expressions required for the generalized Hamiltonian. Specifically, in Sec. IV.A, useful notations for a Gaussian profile of a coherent beam are defined. In Sec. IV.B, using the notations defined in Sec. IV.A, a suite of series expansions that explicitly depend on the non-ideal parameters, including the electric field expression, are derived. In Sec. IV.C, the ways in which noise may now couple into the system are described and a strategy to use the derived expressions described herein for an efficient and systematic error analysis in practice is provided.

A. Elliptical Astigmatic Gaussian Beam

Hereinafter, the Gaussian beam is considered to have an elliptical shape with simple astigmatism of a particular form of $E_b e^{\pm i\Phi_b}$, since this particular form can describe a Gaussian beam that is not symmetric due to a certain experimental setup. The beam amplitude $E_b$ and phase angle $\Phi_b$ can be written using the ion position $\vec{r}_b = x_b \hat{e}_{x_b} + y_b \hat{e}_{y_b} + z_b \hat{e}_{z_b}$ as $$E_b(\vec{r}_b) = \sqrt{\frac{P_b}{\pi w_{x_b} w_{z_b}}} e^{-\left(\frac{x_b^2}{w_{x_b}^2} + \frac{z_b^2}{w_{z_b}^2}\right)}, \quad (9)$$

$$\Phi_b(\vec{r}_b) = -k_b y_b + \eta_b - \frac{k_b}{2}\left(\frac{x_b^2}{R_{x_b}} + \frac{z_b^2}{R_{z_b}}\right) + \phi_b,$$

where the beam is assumed to propagate along the $y_b$-axis and the two principal axes are along the $x_b$- and the $z_b$-axes. Here, $P_b$ is the power of the beam, $k_b=2\pi/\lambda_b$ is the wavevector with $\lambda_b$ the wavelength, and $\phi_b$ is a constant phase at the origin which can be chosen arbitrarily along the y-axis. The two principal semi axes, $w_{x_b}$ and $w_{z_b}$, of the spot ellipse at $y_b$ are defined according to $$w_{\alpha_b}(y_b) = w_{\alpha_b}^f \sqrt{1 + \left(\frac{y_b - y_{\alpha_b}^f}{y_{\alpha_b}^R}\right)^2}, \quad (10)$$

where $w_{\alpha_b}^f$ is the beam waist along the $\alpha_b$-axis at the focal point $y_{\alpha_b}^f$ and $y_{\alpha_b}^R$ is the Rayleigh range given by $\pi(w_{\alpha_b}^f)/\lambda_b$. The radii of curvature $R_{\alpha_b}$ are given by $$R_{\alpha_b}(y_b) = \frac{(y_b - y_{\alpha_b}^f)^2 + y_{\alpha_b}^{R\,2}}{y_b - y_{\alpha_b}^f},\quad (11)$$

where $\eta_b$ is the Gouy phase, i.e., $$\eta_b(y_b) = \frac{1}{2}\left(\arctan\frac{y_b - y_{x_b}^f}{y_{x_b}^R} + \arctan\frac{y_b - y_{z_b}^f}{y_{z_b}^R}\right). \quad (12)$$

B. Expansion of the Electric Field

The spatially dependent terms $E_b e^{\pm i\Phi_b}$ can be expanded from the focal points of the beam. Denoting the equilibrium ion position as $r_b^{(0)} = x_b^{(0)}\hat{e}_{x_b} + y_b^{(0)}\hat{e}_{y_b} + z_b^{(0)}\hat{e}_{z_b}$ and the ion excursion as $\{\zeta_{x_b}, \zeta_{y_b}, \zeta_{z_b}\}$, the y-distance between the equilibrium ion position and the x and z focal points is defined as $y_{\alpha_b}^{(0)f} \equiv y_b^{(0)} - y_{\alpha_b}^f$. Then, the regime considered here, i.e., the ion does not venture outside of the Rayleigh range from each focal point of the corresponding principal axis, may be succinctly written as $|y_{\alpha_b}^{(0)f}| \ll y_{\alpha_b}^R$. In this regime, the beam amplitude $E_b$ and the phase angle $e_{i\Phi_b}$ in (9) can be expanded about the focal points of the two principal axes $y_{x_b}^f$ and $y_{z_b}^f$, together with (10), (11), and (12), as $$E_b \equiv \sqrt{\frac{P_b}{\pi w_{x_b}^f w_{z_b}^f}} A_1(\lambda_{x_b}^{(0)}, \hat{\lambda}_{x_b}) A_1(\lambda_{z_b}^{(0)}, \hat{\lambda}_{z_b}) \quad (13)$$

$$A_2(\lambda_{x_b}^{(0)}, \hat{\lambda}_{x_b}, \gamma_{x_b}^{(0)}, \hat{\gamma}_{x_b}) A_2(\lambda_{z_b}^{(0)}, \hat{\lambda}_{z_b}, \gamma_{z_b}^{(0)}, \hat{\gamma}_{z_b})$$

and $$e^{\pm i\Phi_b} \equiv e^{\pm i(\phi_b - k_b y_b^{(0)})} B_0^{\pm}(\hat{\beta}_b) B_1^{\pm}(\lambda_{x_b}^{(0)}, \hat{\lambda}_{x_b}) B_1^{\pm}(\lambda_{z_b}^{(0)}, \hat{\lambda}_{z_b}) \quad (14)$$

$$B_2^{\pm}(\lambda_{x_b}^{(0)}, \hat{\lambda}_{x_b}, \gamma_{x_b}^{(0)}, \hat{\gamma}_{x_b}) B_2^{\pm}(\lambda_{z_b}^{(0)}, \hat{\lambda}_{z_b}, \gamma_{z_b}^{(0)}, \hat{\gamma}_{z_b}),$$

where the spatially dependent terms $E_b e^{\pm i\Phi_b}$ are split into the A and B functions, defined according to $$A_1(p_0, \hat{p}_1) = [1 + (p_0 + \hat{p}_1)^2]^{-1/4} = \sum_{l_p=0}^{\infty} \hat{p}_1^{l_p} \sum_{n=\lceil l_p/2 \rceil}^{\infty} (-1)^n \frac{(4n-3)!!!!}{(4n)!!!!} \binom{2n}{l_p} p_0^{2n-l_p}, \quad (15)$$

$$A_2(p_0, \hat{p}_1, q_0, \hat{q}_1) =$$

$$\exp\left[-\frac{(q_0 + \hat{q}_1)^2}{1 + (p_0 + \hat{p}_1)^2}\right] = \sum_{l_q, l_p=0}^{\infty} \hat{q}_1^{l_q} \hat{p}_1^{l_p} \sum_{\substack{n=\lceil l_q/2 \rceil \\ m=\lceil l_p/2 \rceil}}^{\infty} \frac{(-1)^{n+m}}{n!} \binom{n+m-1}{m} \binom{2n}{l_q} \binom{2m}{l_p} q_0^{2n-l_q} p_0^{2m-l_p},$$

$$B_0^{\pm}(\hat{p}_1) = e^{\mp i \hat{p}_1} = \sum_{n=0}^{\infty} \frac{(\mp i)^n}{n!} \hat{p}_1^n,$$

$$B_1^{\pm}(p_0, \hat{p}_1) =$$

$$\exp\left[\frac{\pm i}{2}\arctan(p_0 + \hat{p}_1)\right] = \sum_{n=0}^{\infty} \frac{(\pm i)^n}{2^n n!} \left\{\sum_{l_p=0}^{\infty} \hat{p}_1^{l_p} \sum_{m=\lceil(l_p-1)/2\rceil}^{\infty} \frac{(-1)^m}{2m+1} \binom{2m+1}{l_p} p_0^{2m+1-l_p}\right\}^n,$$

$$B_2^{\pm}(p_0, \hat{p}_1, q_0, \hat{q}_1) = \exp\left[\mp i\frac{(p_0 + \hat{p}_1)(q_0 + \hat{q}_1)^2}{1 + (p_0 + \hat{p}_1)^2}\right] =$$

$$\sum_{l_q, l_p=0}^{\infty} \hat{q}_1^{l_q} \hat{p}_1^{l_p} \sum_{\substack{n=\lceil l_q/2 \rceil \\ m=\lceil l_p/2 \rceil}}^{\infty} \frac{(\mp i)^n (-1)^m}{n!} \binom{n+m-1}{m} \binom{2n}{l_q} \binom{2m}{l_p} (p_0 + \hat{p}_1)^n q_0^{2n-l_q} p_0^{2m-l_p},$$

where: $\binom{\bullet}{\bullet}$ denotes a binomial coefficient, $\lceil \bullet \rceil$ denotes the ceiling function, $p_0$ may be $\lambda_{x_b}^{(0)}$ or $\lambda_{z_b}^{(0)}$, $\hat{p}_\perp$ may be $\hat{\lambda}_{x_b}, \hat{\lambda}_{z_b}$, or $\hat{\beta}_b$, $q_0$ may be $\gamma_{x_b}^{(0)}$ or $\gamma_{z_b}^{(0)}$, $\hat{q}_1$ may be $\hat{\gamma}_{x_b}$ or $\hat{\gamma}_{z_b}$, and $$\hat{\beta}_b = k_b \hat{\zeta}_{y_b} = \sum_p c_{p,y_b}^\beta (\hat{a}_p + \hat{a}_p^\dagger), \quad (16)$$

$$\gamma_{x_b}^{(0)} = \frac{x_b^{(0)}}{w_{x_b}^f}, \hat{\gamma}_{x_b} = \frac{\hat{\zeta}_{x_b}}{w_{x_b}^f} = \sum_p c_{p,x_b}^\gamma (\hat{a}_p + \hat{a}_p^\dagger),$$

$$\gamma_{z_b}^{(0)} = \frac{z_b^{(0)}}{w_{z_b}^f}, \hat{\gamma}_{z_b} = \frac{\hat{\zeta}_{z_b}}{w_{z_b}^f} = \sum_p c_{p,z_b}^\gamma (\hat{a}_p + \hat{a}_p^\dagger),$$

$$\lambda_{x_b}^{(0)} = \frac{y_{x_b}^{(0)f}}{y_{x_b}^R}, \hat{\lambda}_{x_b} = \frac{\hat{\zeta}_{y_b}}{y_{x_b}^R} = \sum_p c_{p,x_b}^\lambda (\hat{a}_p + \hat{a}_p^\dagger),$$

$$\lambda_{z_b}^{(0)} = \frac{y_{z_b}^{(0)f}}{y_{z_b}^R}, \hat{\lambda}_{z_b} = \frac{\hat{\zeta}_{y_b}}{y_{z_b}^R} = \sum_p c_{p,z_b}^\lambda (\hat{a}_p + \hat{a}_p^\dagger)$$

are dimensionless. In (8), $\hat{\beta}_b$, $\hat{\gamma}_{\alpha_b}$, and $\hat{\lambda}_{\alpha_b}$ are quantized and used to express the A and B functions defined in (15) in terms of normal motional mode ladder operators and collect all the non-operator coefficients into the c-coefficients. It should be noted that the c-coefficients are inversely proportional to the square-root of their corresponding motional mode frequencies. Further it should be noted that the $B_0^\pm$ terms are conventionally used to formulate two-qubit entangling gates, for instance the Mølmer-Sørensen protocol or the Cirac-Zoller protocol well known in the art. It is sometimes easier to maintain the exponential form for $B_0^\pm$ since its exponent only has first order terms of the motional mode ladder operators.

It should also be noted that the generalized Hamiltonian framework detailed in this section, and shown above, is entirely general with respect to hardware imperfections, such as beam shapes, beam imperfection (e.g., astigmatism), ion positions, or the like. It enables quantum hardware designers to straightforwardly assess the impact of a variety of experimental imperfections on the quantum computational fidelity by reducing one or more error mechanisms identified by the generalized Hamiltonian framework. The generalized Hamiltonian framework described herein serves as a diagnostic tool that aids the designers to locate the major sources of quantum computational errors, critical for developing reliable quantum computers.

C. Error Mechanisms and Analysis Strategy

By examining the expansions described above, four general mechanisms that may cause a quantum computational error through the spatially dependent terms $E_b e^{\pm i\phi_b}$ of the Raman beams (b=1 or 2) can be identified, using a classical computer, such as the classical computer 101. The beam amplitudes $E_b$ and phase angles $\phi_b$ of the Raman beams (b=1 or 2) are computed, using a classical computer, such as the classical computer 101, to account for the effect of the identified error mechanisms (e.g., minimize or eliminate the effect of the identified error mechanisms). The first error mechanism is related to any misalignment, defocus, or distortion of the Raman beam (b=1 or 2) at the ion that is not accounted for can lead to quantum computational errors. The second error mechanism is related to a stray field near the ion that is not compensated or accounted for, which can also lead to quantum computational errors. By the first and second error mechanisms, quantum computational errors propagate through all of the parameters in, (16). Specifically, they affect the scaled-position parameters $\gamma_{\alpha_b}^{(0)}, \gamma_{\alpha_b}^{(0)}$, or the non-operator terms in the definition of $\hat{\beta}_b$, $\hat{\gamma}_{\alpha_b}$, or $\hat{\lambda}_{\alpha_b}$, i.e. the zero-point spread $\zeta_p^{(0)}$, the matrix element $v_p^{\alpha_b}$ of the inverse mode vector matrix, the beam waist wan, or the Rayleigh range $$y_{R_{\alpha_b}}.$$

The third error mechanism is related to the so-called resonant terms that do not change the motional space, i.e., they have equal numbers of $\hat{a}_p$ and $\hat{a}_p^\dagger$ operators. Any even total power of $\hat{\beta}_b$, $\hat{\gamma}_{\alpha_b}$, and/or $\hat{\lambda}_{\alpha_b}$ would contain resonant terms. Apart from the trivial case of a constant term, all the other terms depend on the occupation of the motional Fock space. Thus, any imprecise control or erroneous information on the motional degrees of freedom of the ions can lead to quantum computational errors in the manipulation of ion qubits. A classic example of this mechanism is the well-known Debye-Waller effect. In some embodiments, errors due to the third error mechanism can be suppressed by parameters related to the motional modes, which in turn can be adjusted by adjusting the confining potential and/or other parameters of an ion trap, such as the ion trap 200. In some embodiments, a pulse sequencing method can be additionally or alternatively used to suppress the errors due to the third error mechanism. The fourth error mechanism is related to an ion excursion in the phase space of the ion during a quantum gate operation due to the rest of the $\hat{\alpha}_p$ and $\hat{\alpha}_p^\dagger$ dependent terms. When such an ion excursion occurs and the ion is not returned to its initial position in the phase space after the completion of the quantum gate operation, it can lead to unwanted, lingering entanglement between the internal and the motional degrees of freedom of the ions, which are nontrivial to correct for. This effect could in part be suppressed by reducing the corresponding coefficient for the $\hat{\alpha}_p$ and $\hat{\alpha}_p^\dagger$ dependent terms, sufficient detunings from any motional sideband resonances, and/or by actively shaping a pulse to perform a quantum gate operation. In some embodiments, errors due to the fourth error mechanism can be suppressed by a sufficient detuning, in a range of MHZ, from any motional sideband resonances within a reasonable laser power. In some embodiments, an active pulse shaping can be additionally or alternatively used to suppress the errors due to the fourth error mechanism. The coefficients of the non-resonant terms related to the fourth error mechanism will be a time integral of a pulse function, and thus there is a pulse shape that will eliminate or reduce the coefficients.

In practice, it is cumbersome to directly use the expressions of A and B functions in (15). A proper and justifiable truncation of the power series in (15) becomes an important task for an approximate yet effective error analysis. It should be noted that each function in (15) can be written in the form of a summation of operators, $\Sigma_{ij} \hat{O}_{ij}$, where each operator is in the form of $c_{ij} \hat{p}_1^i q_1^j$. $c_{ij}$ here is a complex constant and coo is always non-zero. The task then is reduced to neglecting some of the operators if their contribution to the Hamiltonian is small. To quantify the contribution, the operator norm $\|\hat{O}_{ij}\|$ is used. The norm is evaluated in a large but finite number of motional degrees of freedom, truncated such that realistic motional-space dynamics can be adequately captured within. In the next section, the error analysis is performed for a realistic situation and a concrete example is provided.

It should be noted the power series of the non-operator terms in (15) can be rewritten in a more compact way by examining terms with ascending power of $\hat{p}_1$. Doing so renders evaluating the size of the individual coefficients of the powers of $\hat{p}_1$ more straightforward. The results for the first three orders are shown in Sec. VIII.

V. Parallel Raman Beam geometry

In this section, an approximate Hamiltonian is derived from the generalized Hamiltonian using realistic parameters. In one example, a concrete analysis based on (15) for a realistic set of Raman beam parameters relevant to contemporary trapped-ion quantum computing architectures is provided. In Sec. V.A, sizes of the parameters commensurate to a contemporary trapped-ion quantum computer are specified. In Sec. V.B, the error analysis strategy laid out in Sec. IV.C is applied and a simplified version of the evolution operator that approximately describes the quantum state evolution is described. In Sec. V.C, the approximate evolution operator is applied and in particular the significance of the axial motional mode temperature in determining fidelity of quantum gate operations when using tightly focused Raman beams is shown.

It is emphasized that the way heating of axial motional mode affect fidelity of a quantum gate operation is similar to the way Debye-Waller effect impact fidelity of a quantum gate operation, i.e., the Rabi frequency for driving the internal degrees of freedom of a trapped ion depends on the number of phonons in the axial motional mode. Therefore, any distribution of motional mode with a non-zero width (i.e., a given motional mode having a probability distribution of the number of phonons that is not peaked at a particular number of phonons with probability 1) directly translates to a distribution in the Rabi frequency with a corresponding non-zero width that decoheres the quantum gate operation. This point is briefly discussed towards the end of Sec. V.C.

A. Parameter Specifications

It is assumed that a chain of trapped ions is addressed by an array of Raman beams propagating in parallel, capable of driving transitions between $|\downarrow\rangle$ and $|\uparrow\rangle$, tightly focused along the chain axis, to achieve individual addressability of trapped ions along the chain. The normal motional modes of the ion chain depending on the dominant projection of their mode vector include axial motional modes that are predominantly along $\hat{x}_b$ (in the X direction), horizontal motional modes that are along $\hat{y}_b$ (in the Y direction), and vertical motional modes that are along $\hat{z}_b$ (in the Z direction). The coordinate systems used herein are defined with respect to the axes of the Raman beams, which are assumed to propagate along $\hat{y}_b$ (in the Y direction) transverse to the ion chain axis (in the X direction), and exhibit an elliptical Gaussian profile with a loose dimension along $\hat{z}_b$ (in the Z direction) and a tight dimension along $\hat{x}_b$ (in the X direction). The equilibrium position of each ion is assumed to reside near the focal point of each Raman beam, such that $y_{\alpha_b}^{(0)} \ll 1$ and $\lambda_{\alpha_b}^{(0)} \ll 1$ is satisfied.

For a quantitative analysis, Raman beams with a wavelength/=355 nm and waists $w_{x_b}^f (w_{z_b}^f)$ larger or similar to ~1 μm (~5 μm) are considered, as might be found on a $^{171}$Yb$^+$ trapped ion quantum computer. The Rayleigh ranges for the two principal axes are then given by $$y_{R_{x_b}}$$

≤10 μm and $$y_{R_{z_b}}$$

≤200 μm. It is assumed the alignment errors in $|x_b^{(0)}|$ and $|z_b^{(0)}|$ are less than 100 nm, and the focusing error in $|y_{\alpha_b}^{(0)f}|$ is bounded by 10% of the corresponding Rayleigh range. Then, $|\gamma_{x_b}^{(0)}|<0.1$, $|\gamma_{z_b}^{(0)}|<0.02$, $|\lambda_{x_b}^{(0)}|<0.1$, and $|\lambda_{z_b}^{(0)}|<0.1$ are satisfied. Similarly, the alignment of a given normal mode to the dominant principle axes of the Raman beams is quantified by an error parameter $\sqrt{N}$, defined as the size of the maximal relative ion excursion of the motional mode vector matrix elements $v_p^{\alpha_b}$ in non-dominant principle axis directions scaled by a factor of $\sqrt{N}$. The magnitude of unintended projection of each mode vector along $\{\hat{x}, \hat{y}, \hat{z}\}$ are then bounded as given in Table I. For the system in consideration, it is assumed the error parameter $\varepsilon$ is smaller than 0.05. Normal mode frequencies $\omega_p/2\pi$ are taken to be approximately 3 MHz in the horizontal direction, 2.5 MHz in the vertical direction, and depending on the number of ions, chain spacing, and the DC potential, between about 150 kHz and about 2 MHz in the axial direction. The resulting magnitude of the c-coefficients that appear in (16) are summarized in Table II.

TABLE I

Alignment of the principal axes of the Gaussian beams with the motional mode vectors of different sets of modes.

| | Axial modes | Horizontal modes | Vertical modes |
|---|---|---|---|
| $|v_p^{xb}|$ | $\sim 1/\sqrt{N}$ | $\leq \varepsilon/\sqrt{N}$ | $\leq \varepsilon/\sqrt{N}$ |
| $|v_p^{yb}|$ | $\leq \varepsilon/\sqrt{N}$ | $\sim 1/\sqrt{N}$ | $\leq \varepsilon/\sqrt{N}$ |
| $|v_p^{zb}|$ | $\leq \varepsilon/\sqrt{N}$ | $\leq \varepsilon/\sqrt{N}$ | $\sim 1/\sqrt{N}$ |

TABLE II

Estimates of the magnitude of the c-coefficients in (16) using the realistic experimental parameters and conditions.

| | Axial modes | | | Horizontal modes | Vertical modes |
|---|---|---|---|---|---|
| $\omega_p/2\pi$ | 150 kHz | 600 kHz | 2.0 MHz | 3.0 MHz | 2.5 MHz |
| $|c_{p,\,y_b}\eta| \times \sqrt{N}$ | ≤ 1e−2 | ≤ 6e−3 | ≤ 3e−3 | ≤ 6e−2 | ≤ 3e−3 |
| $|c_{p,\,x_b}\eta| \times \sqrt{N}$ | ≤ 1e−2 | ≤ 7e−3 | ≤ 4e−3 | ≤ 2e−4 | ≤ 2e−4 |
| $|c_{p,\,z_b}\eta| \times \sqrt{N}$ | ≤ 1e−4 | ≤ 7e−5 | ≤ 4e−5 | ≤ 3e−5 | ≤ 7e−4 |
| $|c_{p,\,x_b}\lambda| \times \sqrt{N}$ | ≤ 7e−5 | ≤ 4e−5 | ≤ 2e−5 | ≤ 3e−4 | ≤ 2e−5 |
| $|c_{p,\,z_b}\lambda| \times \sqrt{N}$ | ≤ 4e−6 | ≤ 2e−6 | ≤ 1e−6 | ≤ 2e−5 | ≤ 9e−7 |

For cooling of the Yb$^+$ ions, Doppler cooling on the $^2S_{1/2}$ to $^2P_{1/2}$ transition is utilized. The motional mode temperatures after the Doppler cooling are given by the average number of phonons at the Doppler limit $\bar{n}_p^D = \Gamma/2\omega_p$ where $\Gamma = 2\pi \times 19.6$ MHz is the natural linewidth of the excited $^2P_{1/2}$ state. Thus, the number of phonons at the Doppler limit is about 4 phonons for the non-axial motional modes, and can range from about 5 to about 70 phonons for the axial motional modes depending on the motional mode frequencies. For the horizontal motional modes, in the case of counter-propagating setup, a sideband cooling sequence is applied, which consists of coherent red sideband pulses, followed by optical pumping. This consistently cools the horizontal motional modes to an average number of phonons $\bar{n} \leq 0.1$.

B. Hamiltonian Approximation

By use of realistic parameters, such as the parameter values detailed above, the power-series truncation strategy laid out in Sec. IV.C is performed. To do so, the extent of truncation in the motional space is determined. For the non-axial directions, the initial temperature of the motional modes (i.e., horizontal motional modes and vertical motional modes) is assumed to be the motional mode temperature at the Doppler limit, since the motional modes in the non-axial directions do not easily heat (i.e., the number of phonons does not easily increase). It is noted that the heating of motional modes in the non-axial direction is harder because their vibrational frequencies are larger than axial motional modes and also because electric field that lead to heating need to respect boundary conditions which are open in the axial direction. For the axial direction, the motional modes readily heat, and the fidelity impact from heating of axial motional mode after a time period of heating is discussed. Thus, about $10^2$ phonons for non-axial motional modes (i.e., horizontal motional modes and vertical motional modes) in the non-axial directions and about $10^4$ phonons for axial motional modes in the axial direction are considered, assuming each and every motional mode for a given direction heat more or less evenly. However, it should be noted that it is possible that there could be a dominant motional mode per direction that heats the most while the rest of the motional modes do not readily heat. To account for such a case, about $10^2 \times N$ phonons for the dominant non-axial motional modes and about $10^4 \times N$ phonons for the dominant axial motional modes are also considered. When determining which operator terms $\hat{O}_{ij}$ to drop from the Hamiltonian, both even heating of all motional modes and heating of a dominant motional mode for each direction are considered. In devising the effective Hamiltonian, $\hat{O}_{ij}$ is dropped from the Hamiltonian only if the fractional contribution from $\hat{O}$ is less than $10^{-2}$ in both cases. It is assumed the number N of ions in the chain 102 be $N \leq 50$ for concreteness.

The expressions in (15) may now be approximated according to the strategy outlined in Sec. IV.C with the parameters specified in Sec. V.A. Keeping only the terms with the size of the fractional contribution larger than $10^{-2}$, the A and B functions are $$A_1 \approx s_0^{1/2}, \quad (17)$$

$$A_2 \approx e^{-s_0^2 q_0^2} \sum_{l_q=0}^{\infty} \frac{(-s_0 \hat{q}_1)^{l_q}}{l_q!} \mathcal{H}_{l_q}(s_0 q_0) = \exp[-s_0^2(q_0 + \hat{q}_1)^2]$$

$$B_0^{\pm} = e^{\mp i \hat{p}_1},$$

$$B_1^{\pm} \approx e^{\pm \frac{i}{2} \arctan(p_0)},$$

$$B_2^{\pm} \approx e^{\mp i s_0^2 q_0^2 p_0},$$

where $s_0 = 1/\sqrt{1+p_0^2}$. It should be noted that the $A_2$ function in (17) may be further approximated in the case where it is used for $z_b$ direction, as in the second $A_2$ function used in (13). Specifically, $A_2(\lambda_{z_b}^{(0)}, \lambda_{z_b}, 65 z_b^{(0)}, \gamma_{z_b})$ function may be truncated to $\exp(-\gamma_{z_b}^{(0)^2}/(1+\lambda_{z_b}^{(0)^2}))$, due to the larger beam waist and lower vertical motional mode temperature along the $z$, directions. It is assumed here $q_0 = Y_{z_b}^{(0)}$ and $\hat{q}_1 = \hat{\gamma}_{z_b}$.

Inserting the simplified A and B functions to the amplitude and phase functions in (13) and (14), respectively, then inserting the simplified amplitude and phase functions to the interaction Hamiltonian $H_I$ in (6), the interaction Hamiltonian $H_I$ is $$H_I = \hbar \Omega_0 \sum_{l=0}^{\infty} \sum_{m=0}^{l} \frac{(-1)^l}{m!(l-m)!} \hat{\gamma}_{\lambda,x_1}{}^m \hat{\gamma}_{\lambda,x_2}{}^{l-m} \mathcal{H}_m(\gamma_{\lambda,x_1}^{(0)}) \mathcal{H}_{l-m}(\gamma_{\lambda,x_2}^{(0)}) \quad (18)$$

$$\left[ e^{i[(\omega^{qbt}+\Delta\omega)t+\Psi_0]} \hat{\sigma}_+ + h.c. \right],$$

with $\hat{\gamma}_{\lambda,x_b} = \gamma_{x_b}/\sqrt{1+\lambda_{x_b}^{(0)^2}}$ and $\gamma_{\lambda,x_b}^{(0)} = \gamma_{x_b}^{(0)}/\sqrt{1+\lambda_{x_b}^{(0)^2}}$. All non-operator terms are collected into a Rabi rate $\Omega_0$ and a phase $\Psi_0$, defined as $$\Omega_0 = \frac{\bar{D}}{\pi \hbar} \sqrt{\frac{P_1 P_2}{w_{x_1}^f w_{x_2}^f w_{z_1}^f w_{z_2}^f}} \quad (19)$$

$$\left[ \left(1+\lambda_{x_1}^{(0)^2}\right)\left(1+\lambda_{x_2}^{(0)^2}\right)\left(1+\lambda_{z_1}^{(0)^2}\right)\left(1+\lambda_{z_2}^{(0)^2}\right) \right]^{-1/4}$$

$$\exp\left[ -\frac{\gamma_{x_1}^{(0)^2}}{1+\lambda_{x_1}^{(0)^2}} - \frac{\gamma_{x_2}^{(0)^2}}{1+\lambda_{x_2}^{(0)^2}} - \frac{\gamma_{z_1}^{(0)^2}}{1+\lambda_{z_1}^{(0)^2}} - \frac{\gamma_{z_2}^{(0)^2}}{1+\lambda_{z_2}^{(0)^2}} \right]$$

and $$\Psi_0 = \phi_1 - \phi_2 + k_2 y_{x_2}^{(0)} - k_1 y_{x_1}^{(0)} + \quad (20)$$

$$\frac{1}{2}\left[ \arctan\lambda_{x_1}^{(0)} + \arctan\lambda_{x_2}^{(0)} + \arctan\lambda_{z_1}^{(0)} + \arctan\lambda_{z_2}^{(0)} \right] -$$

$$\left[ \frac{\lambda_{x_1}^{(0)} \gamma_{x_1}^{(0)^2}}{1+\lambda_{x_1}^{(0)^2}} + \frac{\lambda_{x_2}^{(0)} \gamma_{x_2}^{(0)^2}}{1+\lambda_{x_2}^{(0)^2}} + \frac{\lambda_{z_1}^{(0)} \gamma_{z_1}^{(0)^2}}{1+\lambda_{z_1}^{(0)^2}} + \frac{\lambda_{z_2}^{(0)} \gamma_{z_2}^{(0)^2}}{1+\lambda_{z_2}^{(0)^2}} \right].$$

To arrive at (18), $\|e^{i(\beta_2-\beta_1)}-1\| \approx 1$ is used for both the co- and counter-propagating beams, which means that the Debye-Waller effect is negligible. In the co-propagating setup, the local coordinate systems of the beams are mostly aligned and when the two $B_0^{\pm}$ functions are substituted into the Hamiltonian, the resulting term $e^{i(\beta_2-\beta_1)}$ becomes very close to an identity operation due to the cancellation of the Bb operators. More specifically, using the system information given previously, it is straightforward to show that $\|e^{i(\beta_2-\beta_1)}-1\|$ is smaller than a predetermined error threshold, for example, $10^{-2}$. In the counter-propagating setup, $e^{i(\beta_2-\beta_1)}-1$ does contribute significantly to the Hamiltonian, unless the horizontal motional modes are sufficiently cooled so that $n_H \ll 1$. Since the horizontal motional modes are cooled using sideband cooling to suppress the Debye-Waller effect in all experiments that use the counter-propagating setup, $\|e^{i(\beta_2-\beta_1)}-1\|$ may be assumed smaller than the predetermined error threshold and can thus be neglected, like in the co-propagating case.

The interaction Hamiltonian $H_1$ in (18) can readily be used to assess fidelity impacts of noise sources ranging from beam misalignment and instability, to noise on the ion positions, as well as heating of motional modes in a single-qubit gate operation using, for instance, a Monte-Carlo type simulation. It can also be easily incorporated into a two-qubit Hamiltonian to evaluate errors in a two-qubit gate operation. Note that when the two beams are perfectly aligned with each other, (18) reduces to a single summation with only one Hermite polynomial term in each summand.

C. Axial Motional Mode Temperature Effect

Here, the approximate Hamiltonian expression in (18) is put to test by investigating the fidelity impact of heating of axial motional modes. It is assumed that only one axial motional mode, for instance the center-of-mass (COM) axial motional mode, has a dominant behavior in determining the motional mode temperature, thus dropping the motional mode index p. Next, two realistic situations regarding the beam waist and the beam alignment are considered.

In the first situation, which is representative of the co-propagating setup, two tightly focused beams with identical waists $w_{x_1}^f = w_{x_2}^f$ are considered As a good approximation, it can be assumed that they are perfectly aligned, i.e., $\gamma_{\lambda,x_1}^{(0)} = \gamma_{\lambda,x_2}^{(0)}$ and $|c_{p,x_1}^\gamma| = |c_{p,x_2}^\gamma|$. Then the summation of m in (18) reduces to a single term due to a sum rule of products of two Hermite polynomials. The interaction Hamiltonian $H_1$ can then be transformed with $U_0 = \exp(-iH_0 t/\hbar)$ and obtain $$H_I' = \hbar \Omega_0 \sum_{l=0}^{\infty} \frac{(-1)^l}{l!} (\eta)^l \mathcal{H}_l(\xi) \left( e^{-i\omega t} \hat{a} + e^{i\omega t} \hat{a}^\dagger \right)^l \left[ e^{i(\Delta \omega t + \Psi_0)} \hat{\sigma} + h.c. \right], \quad (21)$$

where $$\eta = \frac{\zeta^{(0)} v^x}{w_x^{eff} \sqrt{1 + y_x^{(0)2} f^2 / y_x^{R2}}}, \quad (22)$$

$$\xi = \frac{x^{(0)}}{w_x^{eff} \sqrt{1 + y_x^{(0)2} f^2 / y_x^{R2}}}.$$

$w_x^{eff}$ is the effective waist given by $w_x^f / \sqrt{2}$. The parameter $\eta$ is proportional to the response of the ion to the kick provided by the beam. The parameter $\xi$ has to do with alignment. Both are scaled parameters (ratios) with respect to the effective beam waist.

In the second situation, which is representative of the counter-propagating setup, one of the Raman beams is considered to be narrowly focused and individually addressing while the other to be very loosely focused and capable of addressing a long ion chain. The loosely focused, global addressing beam has a waist of more than 100 μm which allows us to truncate any $\hat{\gamma}_{\lambda,x}^m$ term with m>0. Thus, the interaction Hamiltonian $H_1$ is again of the form in (21). The only difference is that the effective waist here is given by waist $w_x^f$ of the narrowly focused beam.

For a single-qubit gate operation, the Raman transition is derived at the qubit frequency, i.e., $\Delta\omega = 0$. Then any term with imbalanced numbers of $\hat{a}$ and $\hat{a}^\dagger$ are off-resonant and thus suppressed. Neglecting these fast-rotating couplings, the evolution operator of a single-qubit gate pulse that has a constant power of a time duration of $t_{sqg}$ can be simply written as $$U_I = e^{-iH_I' t_{sqg}/\hbar} \approx \sum_n \left( \cos\Theta_n \hat{I} - i\sin\Theta_n \hat{\sigma}_{\Psi_0} \right) |n\rangle\langle n|, \quad (23)$$

where $|n\rangle$ is a Fock state in the axial motional mode space, $\hat{\sigma}_{\Psi_0} = \exp(i\Psi_0)\hat{\sigma} + h.c.$, $\hat{I}$ is the identity operator in the qubit space, and $\Theta_n$ is defined as $$\Theta_n = \Omega_0 t_{sqg} \sum_{m=0}^{\infty} \left( \frac{-\eta^2}{2} \right)^m \frac{\mathcal{H}_{2m}(\xi)}{m!} \, {}_2\mathcal{F}_1(1+n, -m; 1; 2), \quad (24)$$

using $$\langle n | (\hat{a} + \hat{a}^\dagger)^{2m} | n \rangle = \quad (25)$$

$$\sum_{i=0}^{m} \left(-\frac{1}{2}\right)^{m-i} \frac{(n+i)!(2m)!}{n!(m-i)!(i!)^2} = \left(-\frac{1}{2}\right)^m \frac{(2m)!}{m!} \, {}_2\mathcal{F}_1(1+n, -m; 1; 2),$$

where ${}_2\mathcal{F}_1(a, b; c; z)$ denotes a Gaussian hypergeometric function. Equation (24) explicitly shows how the Rabi frequency for driving the spin degree of freedom depends on the number of phonons in the axial motional mode. Thus, a distribution of the number of phonons in the axial motional mode with a non-zero width results in a distribution of the Rabi frequency with a corresponding non-zero width which in turn induces decoherence to the quantum gate operation.

It should be noted that the convergence of (24) greatly depends on n and $\bar{n}$. For instance, for perfect alignment, i.e., $\xi \to 0$, with $\bar{n}=0.01$ and n=2000, m=4 is needed to achieve convergence to the third significant digit. To achieve the same accuracy, m=11 is needed for $\bar{n}=0.02$ and n=2000, and m=92 for $\bar{n}=0.02$ and n=20000. To mitigate some of the convergence issue, if it is assumed $\xi \to 0$, $\mathcal{H}_{2m} = (-1)^m (2m)!/m!$ can be obtained and thus (24) can be simplified as $$\Theta_n = \frac{\Omega_0 t_{sqg}}{\sqrt{1 + 2\eta^2}} \, {}_2\mathcal{F}_1\left( \frac{1}{2}, -n; 1; \frac{4\eta^2}{1 + 2\eta^2} \right). \quad (26)$$

Once a proper care for convergence is taken, it is straightforward to insert (26) in (23) to evaluate the effect of the axial motional mode temperature on the fidelity of a single-qubit gate operation for different initial states and measurement schemes. Such an analysis is described in more detail in the next section in conjunction with the experimental results.

VI. Examples

In this section, the theoretical results are compared with the experimental results. Specifically, the impact of high-temperature axial motional modes in the presence of tightly focused Raman laser beams is investigated. An experimental apparatus used to obtain the results described herein includes a chain of $^{171}$Yb$^+$ ions in a surface-electrode ion trap, where the axial chain spacing can be controlled by adjusting the voltages on several DC electrodes on the trap. Quantum gate operations are performed via Raman transitions induced by two 355 nm Gaussian beams. The state initialization follows a Doppler cooling sequence, where the initial motional mode temperature is cooled to the Doppler limit. When using the counter-propagating setup, the horizontal motional modes are further cooled to $\bar{n} \leq 0.1$ using a sideband cooling sequence. This reduces to the effective Hamiltonian of (3), where the qubit states $\{|\downarrow\rangle, |\uparrow\rangle\}$ are taken to be the $|F=0, m_F=0\rangle$ and $|F=1, m_F=0\rangle$ hyperfine levels of the ground electronic state, respectively. High-fidelity state preparation is done via optical pumping to the $|0\rangle$ at the beginning of each experiment, and measurement is done by spatially resolved, state-dependent fluorescence detection.

A. Measurement of Axial Motional Mode Temperature Effect

Following the theoretical analysis shown in Sec. V, the following steps were performed to probe the experimental apparatus: (A) the quantum state is initialized to $\rho_0(0) = |\downarrow\rangle\langle\uparrow| \rho_T(0)$, where $|0\rangle$ is a qubit state vector and $$\rho_T(t) = \sum_n \frac{\bar{n}_t^n}{(1 + \bar{n}_t)^{n+1}} |n\rangle\langle n| \quad (27)$$

is the density operator of a thermal state of the axial motional mode at time t with an average Fock state occupation number $\bar{n}_t$; (B) time delay $\Delta t$ is applied so that the axial motional mode is heated to a higher $\bar{n}_{\Delta t}$ and the quantum state becomes $\rho_0(\Delta t)$; (C) a single-qubit gate operation whose unitary is given by (23) with $\hat{\sigma}_{\Psi_0} = \hat{\sigma}_x$ is implemented (D) the final state is measured. These steps were repeated to sample the probability of the final state being measured in $|\uparrow\rangle$. Denoting the measurement projector as $M = |\uparrow\rangle \langle \uparrow| \otimes \hat{I}_{mot}$, where $\hat{I}_{mot}$ is the identity operator in the motional space, based on Sec. V. C, the probability to measure a positive measurement outcome (referred to as a "bright population") $P_\downarrow$ is given by $$P_\uparrow(\bar{n}_{\Delta t}) = Tr\left[U_I \rho_0(\Delta t) U_I^\dagger M\right] = \sum_n \frac{\bar{n}_{\Delta t}^n}{(1 + \bar{n}_{\Delta t})^{n+1}} (\sin \Theta_n)^2, \quad (28)$$

where $\bar{n}_{\Delta t}$ is the average number of phonons after heating over a time delay $\Delta t$. A time delay $\Delta t$ used in the examples described herein is on the order of ms which is much larger than the duration of single-qubit gate operations which are on the order of 10 to 100 μs. Thus, the heating during the gate operation was neglected. Here the bright population $P_\uparrow$ is a direct measure of the final state fidelity hence a good proxy metric for fidelity of the single-qubit gate operation. The same set of steps were repeated for multiple $\Delta t$ values for each experimental setup of different beam arrangements, chain lengths, as well as axial motional mode frequencies.

Figure 6A:
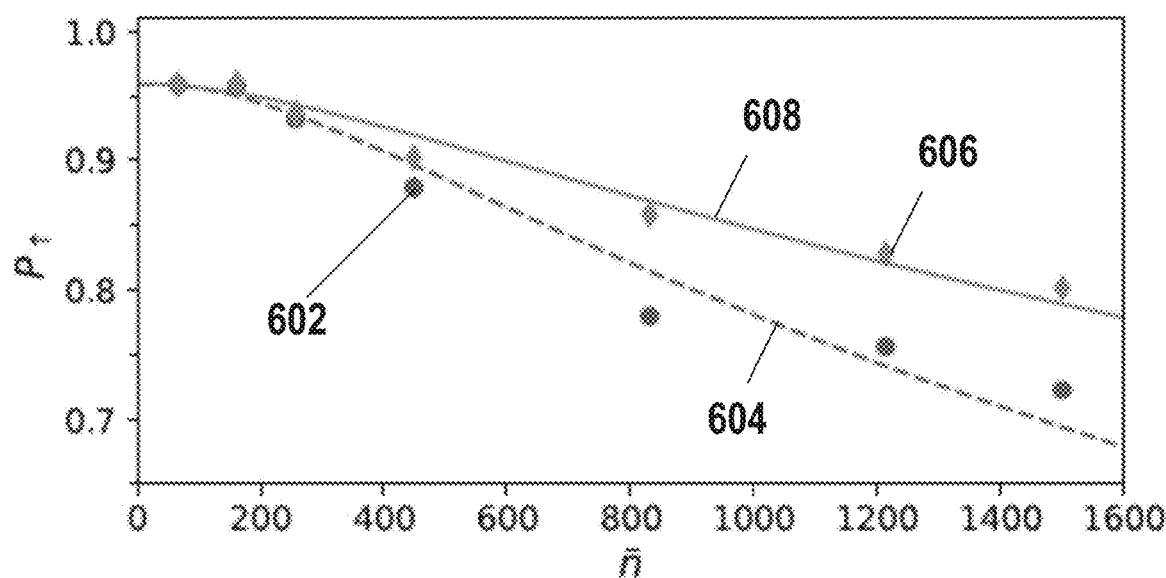
FIG. 6A depicts a bright population as a function of an average number of phonons, according to one embodiment.

FIG. 6A shows the bright population $P_1$ as a function of an average number of phonons $\bar{n}$, obtained according to the expression (28) for the axial motional mode frequency $2\pi \times 153$ kHz. Specifically, the bright population $P_\uparrow$ in (28) is optimized with respect to the Rabi rate $\Omega_0$, while assuming the initial average number of phonons is $\bar{n}_0 \approx 64$, whose value is commensurate to the Doppler limit of the axial motional mode. As can be seen in (9) and (19), the Rabi rate $\Omega_0$ can be adjusted, by computing the beam amplitudes $E_b$ and phase angles $\phi_b$ of the Raman beams (b=1 or 2), using a classical computer, such as the classical computer 101. The beam amplitudes $E_b$ and phase angles $\phi_b$ of the Raman beams (b=1 or 2) can be adjusted, using a system controller, for example, by tightening or loosening the beam focus. Once the specific Rabi rate $\Omega_0$ is obtained, hereafter referred to as the static Rabi rate $\Omega_0^{st}$, the bright population $P_\downarrow$ may be plotted as a function of an average number of phonons n. To compare, experimentally, the bright population $P_\downarrow$ was measured as a function of the time delay $\Delta t$ using the static Rabi rate $\Omega_0^{st}$, calibrated without any delay, and the time delay $\Delta t$ was mapped to an average number of phonons $\bar{n}$ according to a constant heating rate model, i.e., $\bar{n} = \bar{n}_0 + \dot{\bar{n}} \Delta t$. The experiments were conducted on a single ion confined in a harmonic well, where the axial motional mode frequency was adjusted to $2\pi \times 153$ kHz by changing the voltages of the DC electrodes of the ion trap. The co-propagating beam setup was used with beam waists $w_x^f = 1.4$ μm. Experimental results shown in the circles 602 and simulation results shown in the dashed line 604 are based on the static Rabi rate-based method, where $\dot{\bar{n}} \approx 96$/ms which agrees with the motional model the best was used. The agreement between the experimental results and the simulation results confirms the effect of heating in the axial motional mode on fidelity of a quantum gate operation. The experimental results shown in the diamonds 606 and simulation results shown in the solid line 608 are obtained by optimizing over the Rabi rate $\Omega_0$ for each time delay $\Delta t$, mapped to the average number of phonons $\bar{n}$ as described previously with the same heating rate $\dot{\bar{n}}$ and initial average number of phonons $\bar{n}_0$. The optimal Rabi rate obtained from this approach is hereafter denoted as $\Omega_0^{opt}$.

B. Improvement in the Quantum Gate Fidelity

Figure 6B:
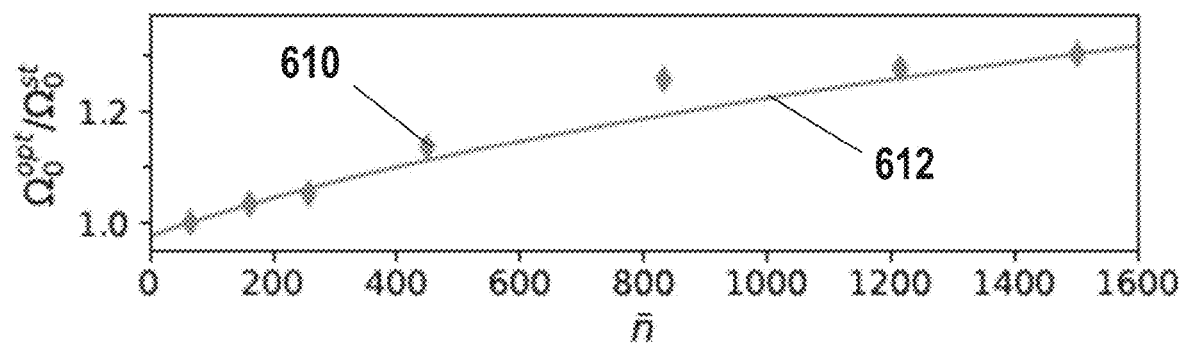
FIG. 6B depicts a ratio of an optimized Rabi rate to a static Rabi rate as a function of an average number of phonons, according to one embodiment.

Improvement in the bright population $P_\downarrow$ hence fidelity of a quantum gate operation over the static Rabi rate-based method may readily be achieved by the following. As discussed in the static Rabi rate-based method, it is assumed the Rabi rate $\Omega_0$ to be that obtained for the initial average number of phonons $\bar{n}_0$. In theory, the bright population $P_\downarrow$ may be maximized with respect to the Rabi rate $\Omega_0$ for any average number of phonons $\bar{n}$. If the bright population $P_\downarrow$ is allowed to be individually optimized for different values of the average number of phonons $\bar{n}$, values of the bright population $P_\downarrow$ that are larger than those obtained by the static Rabi rate-based method can be obtained. FIG. 6B shows the ratio of the optimized Rabi rate to the static Rabi rate $\Omega_0^{opt}/\Omega_0^{st}$ of the experimental results and simulation results shown in FIG. 6A. It can be observed that by adjusting the Rabi rate $\Omega_0$ according to the average number of phonons n, improvement in fidelity of a quantum gate operation can be achieved. The diamonds 610 are for the experimental results and the solid line 612 is for the simulation results. It is then possible, given a known initial motional mode temperature and heating rate n, to predict the optimal Rabi rate $\Omega_0^{opt}$ for any quantum gate operation embedded in a quantum circuit without explicit calibration, thus improving the overall fidelity of the quantum circuit.

Figure 7:
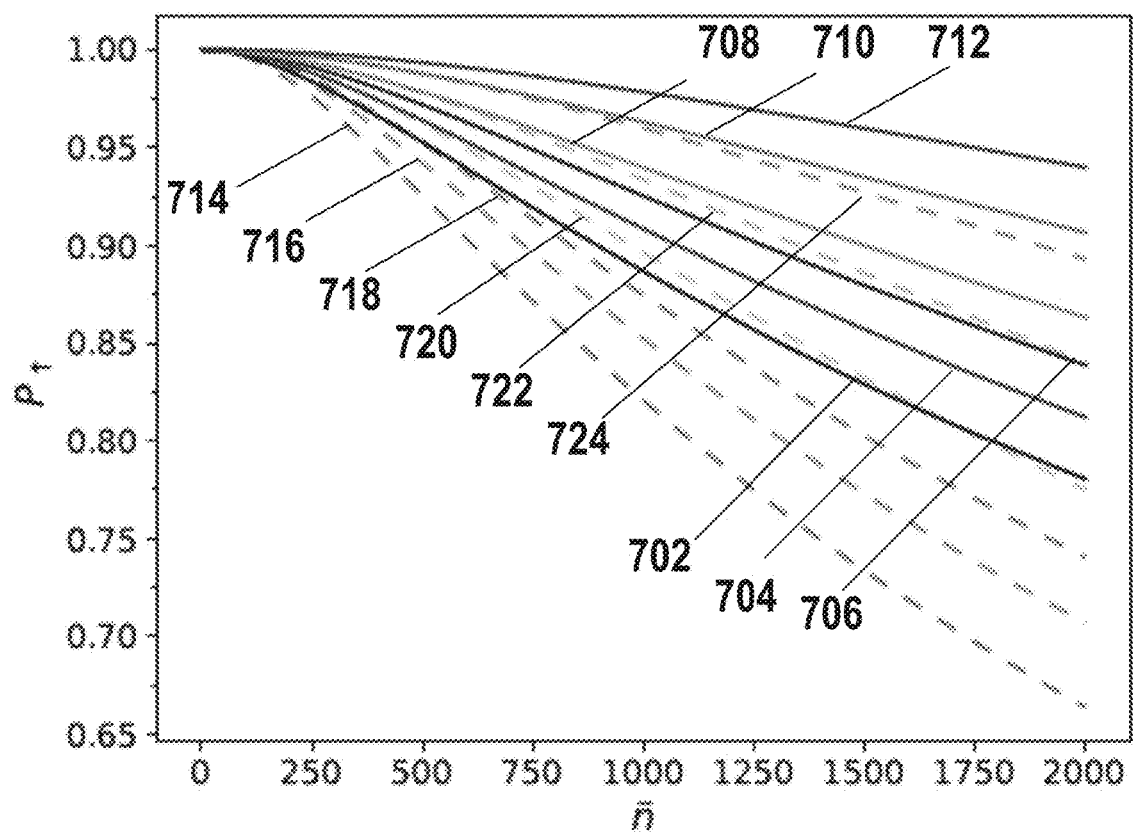
FIG. 7 depicts a bright population as a function of an average number of phonons, according to one embodiment.

Further improvement in fidelity of a quantum gate operation over the axial motional mode heating may be achieved by raising the axial motional mode frequency through the following two mechanisms. Firstly, increasing the motional mode frequency $\omega_A$ decreases $\eta$ in (22), which in turn reduces the widths of the distribution of $\theta_n$ with respect to a specific distribution of n and lessens its decoherence effect on the quantum gate operation. FIG. 7 shows the bright population $P_\downarrow$ as a function of an average number of phonons $\bar{n}$ for a variety of axial motional mode frequencies, ranging from $2\pi \times 153$ kHz to $2\pi \times 513$ kHz. The solid lines 702, 704, 706, 708, 710, and 712 represent the bright population $P_\downarrow$ at axial motional mode frequencies $2\pi \times 153$ kHz, $2\pi \times 184$ kHz, $2\pi \times 217$ KHz, $2\pi \times 256$ KHz, $2\pi \times 362$ kHz, and $2\pi \times 513$ kHz, respectively, obtained by the optimized Rabi rate-based method and the dashed-lines 714, 716, 718, 720, 722, and 724 represent the bright population $P_\downarrow$ at axial motional mode frequencies $2\pi \times 153$ kHz, $2\pi \times 184$ KHz, $2\pi \times 217$ KHz, $2\pi \times 256$ KHz, $2\pi \times 362$ KHz, and $2\pi \times 513$ KHz, respectively, obtained by the static Rabi based method. It can be observed that the bright population $P_\downarrow$ obtained by the optimized Rabi rate-based method and the static Rabi rate-based method both decay slower in n for higher axial motional mode frequencies. For a given average number of phonons n, a factor R increase in the axial motional mode frequency approximately translates to reduction in fidelity of a quantum gate operation by R, which is due to the fact that $1 - P_\downarrow$ is proportional to $\eta^2$ to the zeroth order. Secondly, increasing an axial motional mode frequency in most cases decreases the heating rate associated with the motional mode thus improves the overall fidelity of any quantum circuit of depth larger than one. This can done by observing FIG. 7, using $P_\downarrow$ as the proxy for the fidelity. Different axial motional frequencies show different decay behaviors in $P_\downarrow$.

C. Heating Rate Probe

It is noted that the motional model described herein can in fact serve as a convenient tool in experiments to extract the heating rate of the axial motional mode for a single ion or for an ion chain if its COM axial motional mode heats much faster than the rest of the motional modes. To obtain an accurate estimate, the static and optimized $P_\downarrow$ should be measured at different time delay $\Delta t$ along with the optimal Rabi rate $Q_0^{opt}$. The experimental measurement of the bright distribution $P_\uparrow$ as well as the ratio $\Omega_0^{opt}/\Omega_0^{st}$ can be fitted to the theoretical predictions by adjusting the initial temperature $\bar{n}_0$ and the heating rate n as fitting parameters. In some embodiments, the initial temperature $\bar{n}_0$ is fixed to the motional mode temperature at the Doppler limit to reduce the number of fitting parameters. To account for all other mechanisms of decoherence that do not depend on the motional mode temperature but results in a reduction in the bright distribution $P_\downarrow$, an additional fitting parameter $\delta P_\downarrow$ is included so that the final form of the fitting functions are given by $$P_\uparrow^{Exp}(\Delta t) \Leftrightarrow P_\uparrow^{Sim}(\bar{n}_0 + \dot{\bar{n}}\Delta t) - \delta P_\uparrow, \qquad (29)$$

$$\Omega_0^{opt,Exp}(\Delta t) \Leftrightarrow \Omega_0^{opt,Sim}(\bar{n}_0 + \dot{\bar{n}}\Delta t),$$

$$\Omega_0^{st,Exp} \Leftrightarrow \Omega_0^{st,Sim} = \Omega_0^{opt,Sim}(\bar{n}_0).$$

Figure 8:
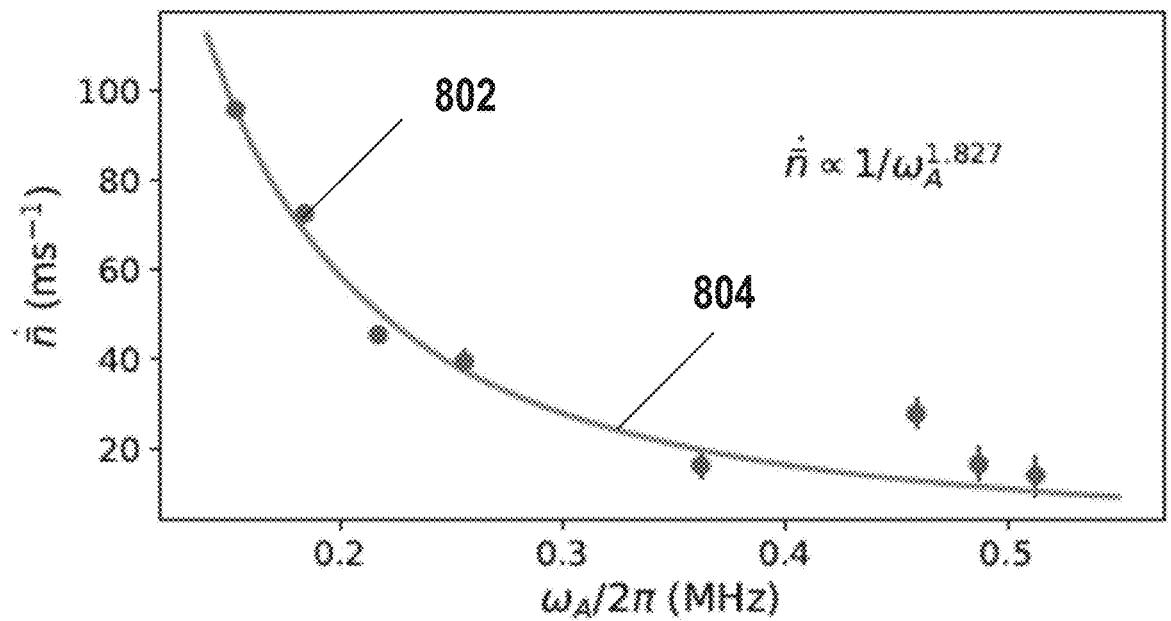
FIG. 8 depicts a heating rate for an axial motional mode of a single ion, according to one embodiment.

The same experiment on a single ion with axial motional mode frequency $\omega_A$ was repeated for several higher values from $2\pi \times 184$ kHz up to $2\pi \times 513$ kHz. Using the fitting method described above, n is extracted as a function of the axial motional mode frequency, shown in FIG. 8. FIG. 8 illustrates extracted a heating rate n for the axial motional mode of a single ion for eight different axial motional mode frequencies shown as the circles 802. The solid line 804 is the best fitted function of the form $\bar{n}=c/\omega_A^\alpha$. The heating rate $\bar{n}$ is fitted to an inverse power law of the motional mode frequency and $\bar{n} \propto \omega_A^{-1.827}$ is obtained.

The method of measuring motional mode temperature for a single ion described herein complements the method using sideband spectroscopy, in the way that, while sideband spectroscopy works for modes with mode vector projection along the beam propagation direction, the method described herein works for motional mode with mode vector projection perpendicular to the beam propagation direction. It should be further noted that, while the examples shown herein are for relatively large numbers of phonons, it is straightforward to extend the method described herein to lower numbers of phonons. This may be achieved by reducing state-preparation and measurement error and single-qubit gate error, as well as increasing n through reducing the effective beam waist $w_x^{eff}$.

D. Compensating Pulse Sequences

In some embodiments, narrow band compensating pulse sequences, which are a combination of single-qubit gate operations, that amplify amplitude errors in the qubit space can also be employed to increase the sensitivity of $P_\downarrow$ to the heating rate. It should be noted for an ion chain with more than one ion, the sensitivity is reduced due to the fact that n is generally proportional to $1/\sqrt{N}$. In this section, experimental demonstration of the efficacy of such compensating composite pulse sequences, such as SK1 pulse sequence and the Tycko three-pulse sequence (see below for detail) in mitigating the axial-temperature driven error is discussed below. Specifically, experimental measurement of the bright populations $P_\downarrow$ as a function of an average number of phonons n is shown, along with simulations.

A single-qubit gate operation $\mathcal{R}(\theta, \phi)$ that rotates a Bloch vector by $\theta$ about the rotation axis on the equator of the Bloch sphere with polar angle $\phi$ may be parametrized as $$\mathcal{R}(\theta, \phi) = \begin{pmatrix} \cos\frac{\theta}{2} & -ie^{-i\phi}\sin\frac{\theta}{2} \\ -ie^{i\phi}\sin\frac{\theta}{2} & \cos\frac{\theta}{2} \end{pmatrix}. \qquad (30)$$

Then, the SK1 pulse sequence $\mathcal{R}_{SK1}(\pi, 0)$ is given by $$\mathcal{R}_{SK1}(\pi, 0) = \mathcal{R}(2\pi, -\psi)\mathcal{R}(2\pi, \psi)\mathcal{R}(\pi, 0), \qquad (31)$$

where $\psi = \arccos(-\frac{1}{4})$. The Tycko three-pulse sequence $\mathcal{R}_{Tycko}(\pi, 0)$ is given by $$\mathcal{R}_{Tycko}(\pi, 0) = \mathcal{R}(\pi, 2\pi/3)\mathcal{R}(\pi, 4\pi/3)\mathcal{R}(\pi, 2\pi/3). \qquad (32)$$

In practice, $\mathcal{R}(2\pi, \psi)$ is implemented in (31) by executing $\mathcal{R}(\pi, \psi)$ twice, and similarly for $\mathcal{R}(2\pi, -\psi)$.

Figure 9A:
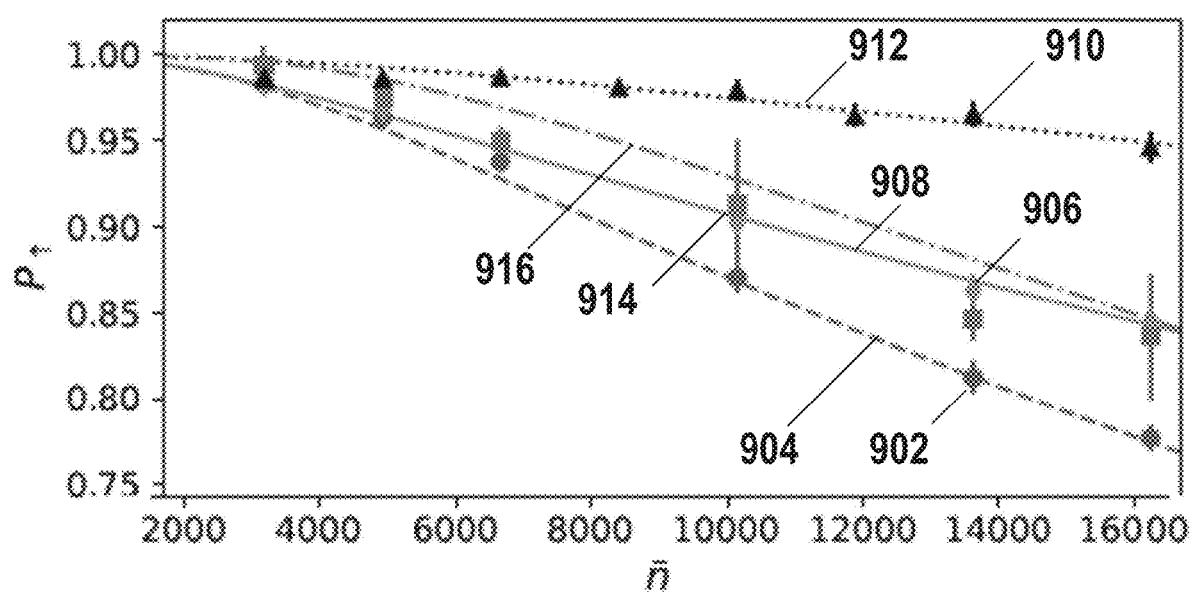
FIG. 9A depicts a bright population as a function of an average number of phonons, according to one embodiment.

FIG. 9A shows the bright population $P_\downarrow$ as a function of an average number of phonons n obtained according to the experimental steps (A)-(D) shown in Sec. VI. A for the static Rabi rate $\Omega_0^{st}$ and the optimized Rabi rates $\Omega_0^{opt}$, in addition to the SK1 pulse sequence and the Tycko three-pulse sequence introduced above. The experiment here was performed on the middle ion of a 25-ion chain which has a COM axial motional mode with a mode frequency $\omega_A = 2\pi \times 148$ KHz that heats the fastest. A counter-propagating setup is used where the individually addressing narrowly focused beam has a waist of 0.87 (2) μm along the x-axis, while the globally addressing beam has a waist of ~200 μm. Sideband cooling of the horizontal motional modes is implemented before state preparation. The dots 902 and the dotted line 904 are experimental and simulation results, respectively, of the static Rabi rate 28t. The dots 906 and the solid line 908 are opt experimental and simulation results, respectively, of the optimized Rabi rates $\Omega_0^{opt}$. Experimental results shown in points 910 and simulation results shown in the line 912 illustrate the Tycko three-pulse sequence effectively mitigates decay of the bright population $P_\downarrow$ decay induced by the motional mode heating. Experimental results shown in points 914 and simulation results shown in the line 916 illustrate the SK1 pulse sequence also effectively mitigates decay of the bright population $P_\downarrow$ decay induced by the motional mode heating. It can be observed that the compensating pulse sequences (i.e., the Tycko three-pulse sequence and the SK1 pulse sequence) provide better performance over the optimized Rabi rate-based method and the static Rabi rate-based method without the compensating pulse sequences. The simulation results, used in the examples described herein, for the SK1 or the Tycko three-pulse sequences assume a systematic phase error of 0.4 radian per gate.

Figure 9B:
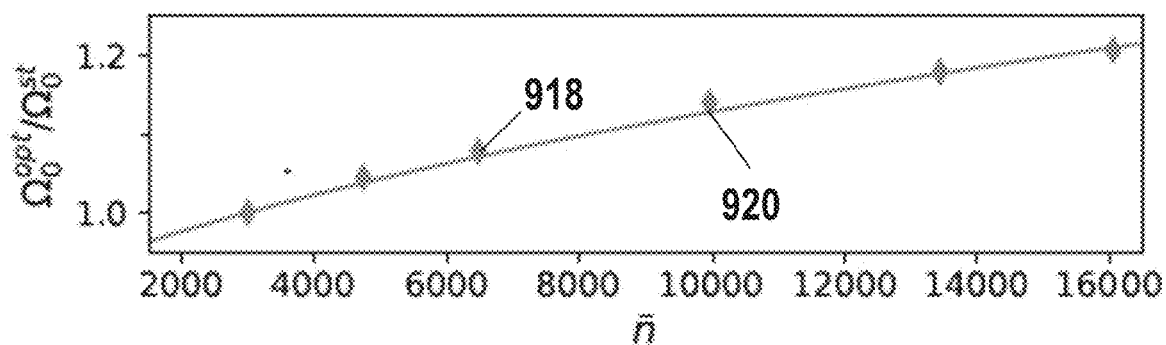
FIG. 9B depicts a ratio of an optimized Rabi rate to a static Rabi rate as a function of an average number of phonons, according to one embodiment.

FIG. 9B illustrates the ratio $\Omega_0^{opt}/\Omega_0^{st}$ as a function of an average number of phonons n. The diamonds 918 are the experimental results and the solid line 920 is the simulation results. The error induced by heating of an axial thermal mode is in essence an amplitude error in the quantum gate unitary, which can be mitigated by compensating pulse sequences that are designed to target amplitude errors.

From FIGS. 9A and 9B, it is evident that these pulse sequences provide further improvement in fidelity of a quantum gate operation compared to the optimized Rabi rate method, with the Tycko three-pulse sequence especially standing out. Note to reach the agreement between the experimental data and the simulation result for the pulse sequences, it is assumed a progressively increasing phase error of 0.4 radian per gate that can be attributed to miscalibrated light shift as well as the qubit frequency error. Such a phase error has no effect on the bright population $P_\downarrow$ of a single Rabi pulse, but reduces the efficacy of the compensating pulse sequences. A better calibrated single-qubit gate operation as the basis gate that composes the SK1 or the Tycko three-pulse sequences will improve the $P_\downarrow$ even further.

VII. Hardware Design Strategy

Figure 10:
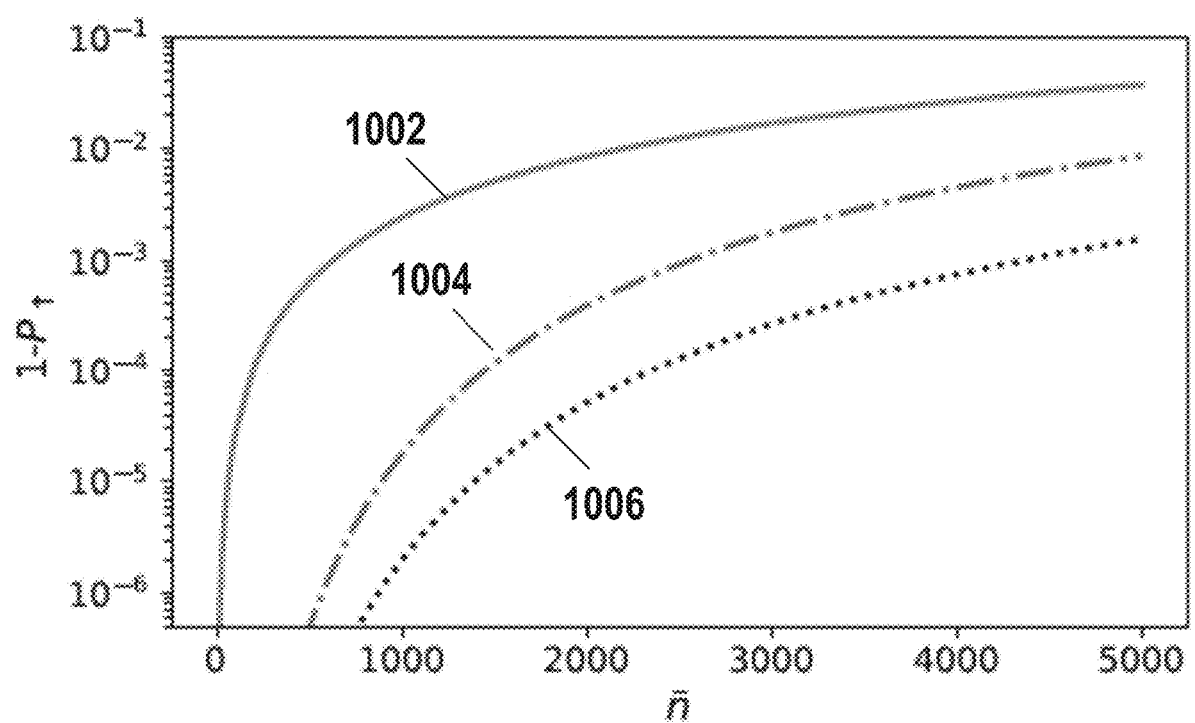
FIG. 10 illustrates simulation of infidelity of a final state according to one embodiment.

From the generalized Hamiltonian framework, it is straightforward to show that fidelity of a quantum gate operation improves rapidly when decreasing the motional mode temperature. FIG. 10 illustrates simulation of the infidelity of the final state, represented by $1-P_\downarrow$, of the middle ion in a 25-ion chain as a function of an average number of phonons n. In this example, only the decoherence effect of the COM axial motional mode with a frequency of $2\pi \times 148$ KHz is considered. The solid line 1002 represents the optimized Rabi rate-based method, the dash-dotted line 1004 represents the SK1 pulse sequence case, and the dotted line 1006 represents the Tycko three-pulse sequence case. Inspecting FIG. 10 and considering the hardware design strategy, reducing heating rate of an ion trap itself by a modest amount would help dramatically improve fidelity of quantum gate operations, since it will prevent heating of axial motional modes. An efficient sympathetic cooling scheme during a quantum circuit execution can also be considered, thus keeping the heating rate $\bar{n}$ to an acceptable level throughout the quantum computational runtime. Raising axial motional mode frequencies by either decreasing the ion spacing or using optical tweezers is also a viable way to improve fidelity of a quantum gate operation, since this helps reduce the size of $\eta$ and may reduce the heating rate $\bar{n}$. It should be noted that increasing the waist of the individually addressing Raman beam will directly decrease $\eta$, thus reducing the undesirable decoherence. Finally, by use of the compensating pulse sequences described herein fidelity can be significantly improved. FIG. 10 shows additional simulation data that shows the expected infidelity $1-P_\downarrow$ for the SK1 and the Tycko three-pulse sequences. It is clear that the compensating pulse sequences can significantly increase the range of the heating rate $\bar{n}$ acceptable for a successful quantum gate operation with high fidelity.

It should be noted additional terms in the interaction Hamiltonian can now be systematically included in descending order of their contribution towards infidelity of a quantum gate operation to help achieve high fidelity trapped-ion quantum computing. For example, the Debye-Waller effect inducing terms $B_0^\pm$ can be included. Higher order terms in the $B_1^\pm$ function can be considered as well that originated from the Gouy phase. It should be noted the latter will manifest themselves as a small correction to the Debye-Waller effect. These terms will induce decoherence, if the temperature of the motional modes of an ion chain is high and/or the misalignment between the ion and its addressing beam is large. The Hamiltonian framework disclosed herein analytically captures these effects accurately and provides quantitative methodologies to characterize their impact on fidelity of a quantum gate operation.

Although the effect on single-qubit gate operations, pertaining the coupling to the axial motional modes is mainly described, similar derivation and analysis can readily be extended to two-qubit gate operations. In fact, most of the conclusion including mitigation strategies and techniques for single-qubit gates hold analogous and similar counterparts for two-qubit gate operations. Therefore, in some embodiments, one or more of the mitigation strategies and techniques described herein are used in two-qubit gate operations.

In this disclosure, a general Hamiltonian capable of pinpointing the sources of infidelity in trapped-ion quantum computers with a long chain is provided. By carefully analyzing the Hamiltonian with realistic beam geometry and parameters, quantum computational errors incurred due to alignment and focus have been identified. The generalized Hamiltonian framework described herein is versatile, precisely laying out all terms of importance according to the user defined quality requirement for any trapped-ion quantum computing platform. It is expected the results described herein can enable a hardware engineer to make informed decisions when designing a quantum computer.

While the foregoing is directed to specific embodiments, other and further embodiments may be devised without departing from the basic scope thereof, and the scope thereof is determined by the claims that follow.

The invention claimed is:

1. A method of performing a quantum gate operation in an ion trap quantum computing system, comprising:
    identifying one or more error mechanisms that cause a quantum computational error in a quantum gate operation on a first trapped ion of an ion chain comprising a plurality of trapped ions, wherein the quantum gate operation is performed by applying a first Raman laser beam and a second Raman laser beam that are configured to cause a Raman transition in the first trapped ion in the ion chain and a coupling between the first trapped ion and one or more axial motional modes of the ion chain;
    measuring a temperature of an axial motional mode of the ion chain;
    computing a first amplitude of the first Raman laser beam, and a second amplitude of the second Raman laser beam such that the effect of the identified one or more error mechanisms is accounted for; and
    applying the first Raman laser beam having the computed first amplitude and the second Raman laser beam having the computed second amplitude on the first trapped ion to perform the quantum gate operation on the first trapped ion,
    wherein the first and second amplitudes are computed based on the measured temperature of the axial motional mode of the ion chain.

2. The method of claim 1, further comprising:
    raising a frequency of the axial motional mode of the ion chain.

3. The method of claim 2, wherein
    the raising of the frequency of the axial motional mode of the ion chain comprises adjusting a confining potential generated by an ion trap in which the plurality of trapped ions are confined.

4. The method of claim 1, further comprising:
    applying a SK1 pulse sequence to the first trapped ion, wherein the SK1 pulse sequence comprises a plurality of single-qubit gate operations on the first trapped ion.

5. The method of claim 1, further comprising:
    applying a Tycko three-pulse sequence to the first trapped ion, wherein the Tycko three-pulse sequence comprises a plurality of single-qubit operations on the first trapped ion.

6. The method of claim 1, further comprising:
applying the first Raman laser beam having the computed first amplitude and the second Raman laser beam having the computed second amplitude on a second trapped ion in the ion chain,
wherein the quantum gate operation on the first and second trapped ions.

7. An ion trap quantum computing system, comprising:
a quantum processor comprising an ion chain including a plurality of trapped ions, each trapped ion having two hyperfine states;
one or more lasers configured to emit a first Raman laser beam and a second Raman laser beam, which is provided to the ion chain in the quantum processor;
a classical computer configured to perform operations comprising:
identifying one or more error mechanisms that cause a quantum computational error in a quantum gate operation on a first trapped ion of the ion chain, wherein the quantum gate operation is performed by applying the first Raman laser beam and the second Raman laser beam that are configured to cause a Raman transition in the first trapped ion in the ion chain and a coupling between the first trapped ion and one or more axial motional modes of the ion chain; and
computing a first amplitude of the first Raman laser beam, and a second amplitude of the second Raman laser beam such that the effect of the identified one or more error mechanisms is accounted for; and
a system controller configured to execute a control program to control the one or more lasers to perform operations on the quantum processor, the operations comprising:
measuring a temperature of an axial motional mode of the ion chain;
applying the first Raman laser beam having the computed first amplitude and the second Raman laser beam having the computed second amplitude on the first trapped ion to perform the quantum gate operation on the first trapped ion; and
measuring population of qubit states in the quantum processor, wherein the first and second amplitudes are computed based on the measured temperature of the axial motional mode of the ion chain the classical computer is further configured to output the measured population of qubit states in the quantum processor.

8. The ion trap quantum computing system of claim 7, wherein the operations further comprise:
raising a frequency of the axial motional mode of the ion chain.

9. The ion trap quantum computing system of claim 8, wherein
the raising of the frequency of the axial motional mode of the ion chain comprises adjusting a confining potential generated by an ion trap in which the plurality of trapped ions are confined.

10. The ion trap quantum computing system of claim 7, further comprising:
applying a SK1 pulse sequence to the first trapped ion, wherein the SK1 pulse sequence comprises a plurality of single-qubit gate operations on the first trapped ion.

11. The ion trap quantum computing system of claim 7, further comprising:
applying a Tycko three-pulse sequence to the first trapped ion, wherein the Tycko three-pulse sequence comprises a plurality of single-qubit operations on the first trapped ion.

12. The ion trap quantum computing system of claim 7, further comprising:
applying the first Raman laser beam having the computed first amplitude and the second Raman laser beam having the computed second amplitude on a second trapped ion in the ion chain, wherein the quantum gate operation on the first and second trapped ions.

13. An ion trap quantum computing system, comprising:
a classical computer;
a quantum processor comprising an ion chain including a plurality of trapped ions, each trapped ion having two hyperfine states;
a system controller configured to execute a control program to control the one or more lasers configured to emit a first Raman laser beam and a second Raman laser beam, which is provided to the ion chain in the quantum processor; and
non-volatile memory having a number of instructions stored therein which, when executed by one or more processors, causes the ion trap quantum computing system to perform operations comprising:
identifying, by the classical computer, one or more error mechanisms that cause a quantum computational error in a quantum gate operation on a first trapped ion of the ion chain, wherein the quantum gate operation is performed by applying the first Raman laser beam and the second Raman laser beam that are configured to cause a Raman transition in the first trapped ion in the ion chain and a coupling between the first trapped ion and one or more axial motional modes of the ion chain;
measuring, by the system controller, a temperature of an axial motional mode of the ion chain;
computing, by the classical computer, a first amplitude of the first Raman laser beam, and a second amplitude of the second Raman laser beam such that the effect of the identified one or more error mechanisms is accounted for;
applying, by the system controller, the first Raman laser beam having the computed first amplitude and the second Raman laser beam having the computed second amplitude on the first trapped ion to perform the quantum gate operation on the first trapped ion;
measuring, by the system controller, population of qubit states in the quantum processor; and
outputting, by the classical computer, the measured population of qubit states in the quantum processor, wherein the first and second amplitudes are computed based on the measured temperature of the axial motional mode of the ion chain.

14. The ion trap quantum computing system of claim 13, wherein the operations further comprise:
raising a frequency of the axial motional mode of the ion chain,
wherein the raising of the frequency of the axial motional mode of the ion chain comprises adjusting a confining potential generated by an ion trap in which the plurality of trapped ions are confined.

15. The ion trap quantum computing system of claim 13, further comprising:
applying a SK1 pulse sequence to the first trapped ion, wherein the SK1 pulse sequence comprises a plurality of single-qubit gate operations on the first trapped ion.

16. The ion trap quantum computing system of claim 13, further comprising:
applying a Tycko three-pulse sequence to the first trapped ion, wherein the Tycko three-pulse sequence comprises a plurality of single-qubit operations on the first trapped ion.

17. The ion trap quantum computing system of claim 13, further comprising:
applying the first Raman laser beam having the computed first amplitude and the second Raman laser beam having the computed second amplitude on a second trapped ion in the ion chain,
wherein the quantum gate operation on the first and second trapped ions.

* * * * *